US006985831B2

(12) United States Patent
Ito et al.

(10) Patent No.: US 6,985,831 B2
(45) Date of Patent: Jan. 10, 2006

(54) SYSTEM FOR ACQUIRING DATA FROM FACILITIES AND METHOD CIP

(75) Inventors: Toku Ito, Calgary (CA); Kevin Benterud, Sherwood Park (CA); Robert Do, Edmonton (CA); Andrew Jarman, Edmonton (CA)

(73) Assignee: zed.i solutions (Canada), inc., Edmonton (CA)

( * ) Notice: Subject to any disclaimer, the term of this patent is extended or adjusted under 35 U.S.C. 154(b) by 0 days.

(21) Appl. No.: 10/273,720

(22) Filed: Oct. 18, 2002

(65) Prior Publication Data

US 2003/0154056 A1 Aug. 14, 2003

Related U.S. Application Data

(63) Continuation-in-part of application No. 09/482,415, filed on Jan. 13, 2000, now abandoned.

(51) Int. Cl.
*G06F 11/00* (2006.01)

(52) U.S. Cl. ...................................................... 702/188
(58) Field of Classification Search ................ 702/188, 702/6, 57; 166/350, 252, 250; 455/12; 340/632, 340/3, 310, 527; 709/250; 705/36, 412; 370/466; 175/50; 346/33; 700/5
See application file for complete search history.

(56) References Cited

U.S. PATENT DOCUMENTS

| | | | |
|---|---|---|---|
| 4,382,385 A | 5/1983 | Paros | |
| 4,531,193 A | 7/1985 | Yasuhara et al. | |
| 4,583,170 A | 4/1986 | Carlin et al. | |
| 4,850,227 A | 7/1989 | Luettgen et al. | |
| 5,325,312 A | 6/1994 | Kidd | |
| 5,606,513 A | 2/1997 | Louwagie et al. | |
| 5,680,899 A | 10/1997 | Waid et al. | |
| 5,790,977 A | 8/1998 | Ezekiel | |
| 5,829,520 A * | 11/1998 | Johnson | 166/250.01 |
| 5,873,049 A | 2/1999 | Bielak et al. | |
| 5,899,962 A | 5/1999 | Louwagie et al. | |
| 5,909,493 A | 6/1999 | Motoyama | |
| 5,940,290 A | 8/1999 | Dixon | |
| 5,975,737 A | 11/1999 | Crater et al. | |
| 6,023,223 A | 2/2000 | Baxter, Jr. | |
| 6,276,306 B1 | 8/2001 | Murphy et al. | |
| 6,421,354 B1 * | 7/2002 | Godlewski | 370/466 |

FOREIGN PATENT DOCUMENTS

EP 0019672 A1 12/1980

* cited by examiner

*Primary Examiner*—Michael Nghiem
*Assistant Examiner*—Tung Lau
(74) *Attorney, Agent, or Firm*—Dominque & Waddell, PLC

(57) ABSTRACT

A field instrument and system for obtaining pressure, flow and temperature data from a facility. The field instrument includes an enclosure having an opening therein. An integrated analog sensor is sealingly contained within the opening. The field instrument further contains an external analog sensor. An analog to digital converter converts the analog signals to digital readings. An external digital sensor is also provided, with the digital output being communicated through a second opening within the enclosure. A control member that receives, stores and processes the digital readings is positioned within the enclosure. A communication module is included to transmit the digital readings to a remote computer. The communication module allows for two way communication between the field instrument and remote computer. The remote computer may be a server that allows for access by many users. The communication module also allows for locally accessing the digital readings via a serial port to a local terminal.

2 Claims, 14 Drawing Sheets

SYSTEM FOR ACQUIRING DATA FROM FACILITIES AND METHOD CIP

This is a continuation-in-part application of the patent application filed 13, Jan. 2000 as Ser. No. 09/482,415 now abandoned, entitled "System for Acquiring Data from a Facility and Method".

BACKGROUND OF THE INVENTION

This invention relates to a system for obtaining pressure, flow and temperature data from one or more facilities. More particularly, but not by way of limitation, the invention relates to a system having one or more instruments that collect, process and store measurements of pressure, flow and temperature and relays data to a remotely located network data receptor series, where for example it may be accessed by multiple users.

In the production of oil and gas from subterranean reservoirs, operators have found it necessary to complete wells in many remote regions. In order to produce, transport and refine hydrocarbons, it is necessary to construct production facilities at these remote regions. Due to the hazardous nature of hydrocarbons, it is necessary to employ various safety features in all phases of the process to ensure against pollution, explosion, and other safety hazards.

Operators find it beneficial, if not necessary, to monitor pressure, temperature, flow rates, etc from these oil and gas facilities. The reasons for monitoring are numerous. For instance, the operator may wish to test the producing well in order to calculate bottom hole pressure, permeability, skin damage, etc. Additionally, the operator may simply wish to monitor the pressure within separators, pipelines and/or vessels to maintain proper working conditions. Regardless of the specific application, there is a need to accurately monitor conditions at the oil and gas facility in a timely manner.

It is furthermore desirable to provide a system for the monitoring of conditions at a number of individual oil and gas facilities, which may be geographically spread over a given region, to permit a broad assessment of overall conditions in the production facility or region.

Prior art devices have been designed to remotely communicate with oil and gas facilities. For instance, Supervisory Control And Data Acquisition (SCADA) systems have been developed to monitor and communicate with these remote areas. However, these SCADA systems suffer from a variety of deficiencies.

A significant deficiency is related to the inherent limitations of the Master-Slave communication protocol that is employed by SCADA systems. The Slave must be always powered-up waiting for the call from the Master. And when the Master calls, the Slave must immediately respond to the Master to minimize the time Master spends with the Slave.

Further, prior art systems communicate from a limited number of oil and gas facilities to a single monitoring station which in turn relays information to a central control station. This architecture is necessary since the Master monitoring station must poll each Slave Field location individually to prevent communication collisions.

Another limitation in current practice is the accuracy of pressure measurement, which is impaired by ambient temperature fluctuations. This accuracy limitation reduces the effectiveness in many process monitoring applications that depend on measurement stability, such as process simulation or process accounting.

A further limitation of current practice is the elaborate installation requirements that result from the physical size, number of components and complex interconnections that are needed to implement each field location with a remote measurement system.

Therefore, there is a need for a system and method that can capture, store and process accurate pressure, flow and temperature data, and communicate this data in a more flexible manner to a local computer and/or remote server. There is also a need for a system that will allow for users to access data from multiple remote locations on an as needed basis. Further, there is a need for a system that can alert remote users of predetermined alarm conditions in an efficient and timely manner. There is also a need in many practical applications for improved pressure measurement accuracy and stability compared to what is achieved using current practice. There is also a need for an instrument that can work in an oil and gas environment without fear of explosion. There is also a need for an instrument that integrates many of the measurement system components into a single, compact package to simplify installation. These, and many other needs, will be accomplished by the invention herein described.

SUMMARY OF THE INVENTION

The system of the present invention may incorporate one or more field instruments, which are used to collect and transmit data signals from remote locations to a central server. The field instruments could be of the same or differing construction and could be adapted to collect and transmit data respecting a number of operations, conditions, including without restriction oil and/or gas flow rates, pressures, temperatures, production byproduct gas concentrations and the like.

In one possible aspect, the system for transmitting a pressure reading obtained from a process line is disclosed. The pressure reading system comprises as a field sensor instrument, one or more small, explosion proof enclosures having a first opening with a first integrated analog pressure sensor therein which is connected to control means for receiving, processing and storing the digital pressure output readings. The control means is located within the enclosure. A second remote digital sensor is connected to the control means via a second opening within the enclosure. The system may further comprise means, positioned within the internal chamber, for transmitting the digital pressure output readings to a remote location. The system also contains serial communication means for transmitting the processed digital pressure output readings to a terminal located at the facility.

In one of the embodiments, the system includes database means, operatively associated with the transmitting means for transmitting to each field instrument, for storing the digital readings with the database means and allocating the stored digital readings to the individual instrument and/or facility, including a data manager means for receiving, retrieving and communicating the digital readings. The system may further comprise a central server, located remotely from the facility, and wherein the central server is capable of receiving the data.

The system may further comprise a field instrument having user interface means, operatively associated with the database means, for allowing access to the data, and a user computer having means for accessing the user interface means.

The system further comprises a plurality of analog sensors producing an analog signal; an adapter connected to the analog sensor, with the adapter being sealingly received within a second opening in the enclosure; and means, electrically connected to the analog sensor, for converting the analog signals to digital readings.

In one of the preferred embodiments, the transmitting means comprises a communications module means for transmitting the digital pressure output readings using a TCP/IP protocol to a central server via the Internet. The system may further include a user computer, and wherein the user computer has loaded thereon a web browser capable of reading the data and a communications link from the user computer to the Internet.

Although the enclosure is disclosed as housing pressure sensors which are used in sensing pressures, it is to be appreciated that other types of sensors could also be used. For example, temperature sensors and/or chemical sensors could be similarly housed within the field instrument enclosure, in place of, or in addition to the pressure sensors, for use in providing additional sensor data at a given facility.

A process for collecting, transmitting and monitoring data such as a pressure from one or more facilities is also disclosed. The process comprises communicating the pressure to a tubular member and communicating the pressure from the tubular member to a pressure sensor at a given facility. In a preferred embodiment, an enclosure is provided, with the enclosure having a first opening, a second opening, and an inner chamber, and wherein the pressure sensor is housed in the first opening.

The process includes sealing the first opening and the second opening so that the pressure is withheld from the inner chamber so that the pressure is precluded from entering or exiting the inner chamber. A digital pressure reading from the pressure sensor is collected and transferred to a control means for receiving, processing, and storing the digital pressure reading, and wherein the control means is located within the inner chamber. Next, the digital pressure reading in the storage means is transferred to a modem communications means for communicating digital data, and wherein the modem communications means is located within the inner chamber.

In one of the embodiments, the digital pressure reading is converted to a digital packet data in the modem communications means which in turn is transmitted via the modem communications means. The digital packet data is received at a remote data base engine where it is stored for later retrieval. The process may further comprise collecting an analog reading with an analog sensor, and wherein the analog sensor is sealingly housed within the second opening of the enclosure. The analog reading is converted to a digital reading and is transmitted to the control means.

In one of the embodiments, the data base engine contains a data manager and the method further comprises storing the digital pressure data and digital temperature data for each facility. Additionally, the database engine may further contain a central server interface and the process further comprises providing a central server communicated with the database engine via the central server interface and accessing the central server from a user computer. Next, the digital pressure reading for a given facility is requested from the user computer and the digital pressure reading is transmitted to the central server which is ultimately transmitted to the user computer.

According to the teachings of the present invention, it is also possible for a user computer to have a direct link to the control means. The user computer could be located at the facility or at a remote facility. The process would comprise connecting with the control means from the user computer with the direct link, and transmitting the digital pressure reading to the user computer.

In another embodiment, the process includes polling the field instruments data and setting predetermined data limits. Once a predetermined limit is exceeded, this exception will be recorded, and an exception signal is produced. The exception signal is sent to the database. The exception signal is transmitted to the central server and then transmitted to the user computer.

The process may also include sending the digital pressure data to a web server and then sending the digital pressure data to the Internet wherein the digital pressure data may be accessed over the Internet with a web browser from a user computer.

In one of the preferred embodiments, the step of correcting the digital pressure data for ambient temperature effect corruption includes mapping the digital pressure data through iteration and back calculating to a high accuracy pressure reading.

A feature of the present system includes allowing for routine and unattended measurements, data logging and compression and data base generation locally and remotely. It is possible for long term process performance monitoring, on-board configurable process analysis (i.e. report when a process parameter reaches a certain value), and process monitoring and indication.

The operating system has incorporated therein orifice gas flow AGA 3 or AGA 8 calculations, process excursion reporting and time stamping (i.e. for peak demand billing), and warning generation and error logging (i.e. for process interlocks and diagnostics). The operating system performs sampling at rates fixed, programmed sequences, or is triggered and/or auto adjusting. The sampling rate may be based on a pressure set point (rise and fall), the rate of pressure change (rise and fall), the pressure differential (rise and fall), a temperature set point (rise and fall), and the rate of temperature change (rise and fall).

The sampling rate may also be based upon calculated parameters such as flow rate (i.e. high flow, high sample rate), rate of flow rate change (i.e. steady flow, low sample rate, erratic flow, high sample rate). It is possible to have a sample rate related to the state, the change of state, the period or the rate of a digital input signal. Another feature is the ability to perform dynamic and/or static source characterization that includes in-line testing for pipelines, pumping stations, tank farms, etc that need transfer function characterization as well as well testing. For instance, the instrument can be used with shut-in tools to develop "Pressure vs. Time" and "Pressure vs. Flow Rate" characteristic curves for reservoir analysis. The system can also be used for preventive maintenance reminders and system error detection and flagging.

Data transfer and alarm notification capability of this system is significantly more flexible than prior art devices because of the use of TCP/IP protocol. Data transfer and alarm notification capability of this system is significantly more flexible than prior art devices in part because the field instrument, in one preferred embodiment, can initiate a communication to a central location within the functionality of the application layer protocol of the system. For example, instead of waiting until an instrument is poled from a remote master as in the prior art, the system and protocol of one embodiment of the present invention permits the field instrument to decide whether to initiate communications, such as if the field instrument has detected an alarm situation, and supports this data transfer and notification. This flexibility over the prior art devices improves communication within the system, and, can result in more robust alarming. The system will also allow long term data logging and storing of this data. Perhaps most importantly, these instruments have high accuracy, high precision and high resolution of pressure data which is essential for proper management and optimization of oil and gas production and transport facilities.

With reference to external communications, the system allows for communications port management. Additionally, the wireless modem option allows for access to dedicated or local public phone systems or satellite access for very remote locations, which in turn allows access to the Internet or local intranet. The instrument can use either an integrated or remote antenna.

The system data management and data routing features may be configured in various ways. The simplest is a one-to-one relationship where data from one instrument is conveyed to a single user. Instrument and data access is managed by a single user. Second, it is possible to have data collected from many instruments collated and conveyed to a single user. Instrument and data access is managed by a single user. Third, data from many instruments is collected, collated, and conveyed to one or more preferably a variety of users. Instrument and data access and control privileges are managed by a localized or distributed process and may be different for different users.

An onsite user has a local display and indicators that include liquid crystal display (LCD) for presenting measurement results, error codes and message; a light emitting diode (LED) indicating instrument status and a power LED. Manual input switches are included for master reset and system configuration. Also, the local terminal option allows for running local diagnostics, install firmware upgrades and possible local retrieval of process data.

Another instrument feature of the preferred field instrument enclosure construction is that it is compact, relatively self contained, and highly integrated. The enclosure can be used in hazardous locations (it is explosion proof, and rated for Zone 1). The enclosure is physically rugged and environmentally sealed.

Applications include fluid or gas metering, typically in remote processing facilities or pipelines. The field instruments are comparatively low cost and easy to install. Few changes are required to existing facilities.

The system can monitor pressure and flow rate when the instruments are combined with orifice plates. The operating system can instruct the instrument to sample data at rates of up to once per second to enable high temporal resolution flow calculations to be performed. The instrument is suitable for custody transfer applications, point-of-use metering, and transmission pipeline leak checking. The instrument normally acts in a remote data dump mode to periodically deliver logged flow data and flow statistics to a user's database via a wireless digital modem. If required, the instrument can switch into an alarm mode to proactively signal that a process variable or state is out of specification or it can be periodically interrogated to read process conditions. The location of the device may be the well head, pipeline monitoring station etc. Generally, communication will be over a wireless communication channel provided either by a terrestrial cellular service or a digital satellite link. The novel instrument can be used in remote and/or unattended settings or when accurate collection and time stamping of flow rate and totalized volume is required.

The system has multiple uses. For instance, the system can be used on oil and gas platforms, pipeline and pipeline facilities. The system can be used to monitor water production and water table levels. The novel systems can be used for custody transfers, or for monitoring storage and distribution facilities, chemical processing facilities, bulk transfer facilities (trucks, ships, rail cars, etc.) Additionally, the field instruments may be used on point of use systems and utilities including water and sewer.

DETAILED DESCRIPTION OF THE PREFERRED EMBODIMENTS

Figure 1:
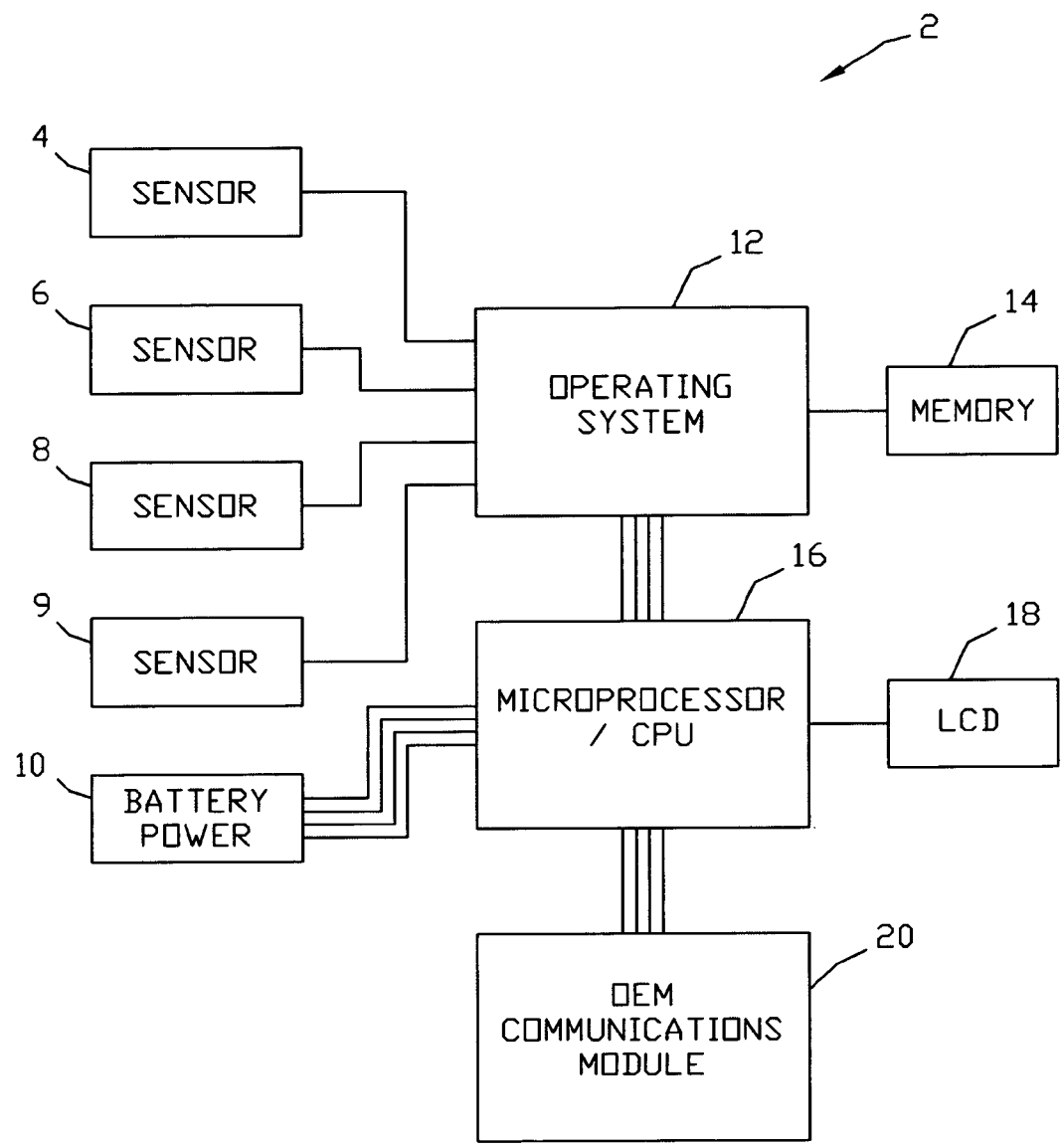
FIG. 1 is a schematic flow chart of the basic components of the surface data system.

Referring now to FIG. 1, a schematic flow chart depicting the basic components of the field instrument 2 (FI) of the present invention will now be described. In a most preferred embodiment, the FI 2 is a very high accuracy pressure instrument designed specifically for use in the oil and gas industry. In the embodiment shown, two analog pressure sensors 4, 6 will be included within the enclosure.

The sensor core is a high accuracy, silicon crystal, strain gauge which has been laser welded into a high pressure autoclave fitting adapter, which in turn is threaded into one of the housing ports located on the enclosure. This sub-assembly is rated for pressures up to 12,000 psi, and has an over-pressure rating of 1.3. Suitable pressure sensors 4, 6 are commercially available from Z.I. Probes, Inc. located in Canada under the mark # 14095140 Pressure Sensor.

An auxiliary analog sensor port is included in the enclosure to attach to a low accuracy external resistive based sensor 8, such as a temperature probe. Temperature probes are commercially available from Omega, Inc. under the name PR-12 Type. The FI 2 may also incorporate an auxiliary digital sensor port 9 so that the device may attach to communicate to a number of external digital sensors over a RS-485 signaled bus. On this bus, the FI 2 will poll external digital sensors using various protocols (i.e. Modbus). The enclosure of the FI 2 is explosion proof, and will be C.S.A./UL certified for operation in Zone 1 (Class I, Div 1, Group C, D, etc) hazardous locations. The actual enclosure will be described later in the application.

In the preferred embodiment, the FI 2 is self-powered by an internal battery pack 10, even though the teachings of the present invention include use of a possible external power source. A rechargeable battery may be used. The rechargeable pack may be replenished by connecting a solar panel or with an externally powered charger as is understood by those of ordinary skill in the art.

Readings are acquired on a preprogrammed time interval via a custom operating system 12 and stored internally in non-volatile memory 14. Between readings, the electronics and sensors are powered off to conserve energy via a preprogrammed routine in the operating system 12. The custom operating system utilizes a Real Time Clock (RTC). This RTC powers up the system at the preprogrammed time and then interrupts the main processor 16 in preparation for acquiring each new reading. Once the electronics have been initialized, the processor 16 will acquire readings from each of the internal sensors 4, 6 and external sensors 8, 9 connected to it, and store these readings in non-volatile memory 12. The operating system 12, memory 14 and micro-processor 16 are referred to as the control means for receiving, processing and storing the data.

Once the readings are processed, they will be optionally displayed on a small LCD 18 that can be viewed through a window in the enclosure as will be described in greater detail later in the application. Alongside the LCD 18 there are also several small switches on the circuit board (not shown) to start an existing program, to reset the processor 16, and to manually configure the FI.

As will be detailed later in the application, the FI 2 can be utilized to measure a variety of process points. For instance, the system can be used for the following: to measure a single pressure and single temperature; to measure two pressures and a temperature; to measure orifice gas flow (which would require measuring a differential pressure) and a temperature. This list is illustrative.

In one of the embodiments disclosed, the FI 2 can be used in the well-testing market. Thus, the invention allows for the monitoring of a pressure build-up test. A line communicating a pressure from any specific well can be communicated with the pressure sensor 4 which will allow for the recording and transmission of data. The FI 2 can be installed onto a well head or pipeline for a short term test or for a long term test. The readings thus collected may be stored in the non-volatile memory 14 or communicated by one of the other described communication means.

One of the advantages of the present system is the multitude of different operation modes. One mode would allow the readings to be downloaded to an on-site computer after a test, such as a standard laptop computer where they are viewed and a report is generated. This mode of operation is termed "Memory" only.

According to the teachings of the present invention, the FI 2 has also been designed with an internal wireless communications module 20. In the preferred embodiment, the communications module 20 is commercially available from Sierra Wireless Inc. under the mark SB300. Field units with the communications module 20 require external power of about 3 Watts, which will recharge the battery 10.

Once installed on the test site, the FI 2 will be self-contained and may be left for long periods at that location. In the mode of operation utilizing the wireless communications module, the FI 2 can relay process information on demand from the host server, on a regular schedule or by exception reporting (i.e. exceeding an alarm threshold which will be described later in the application). Once the raw readings of the sensors 4, 6, 8, 9 are acquired, these readings are converted to process values. This is done using an algorithm and a calibration (CAL) file.

The module 20 that has been packaged into the FI 2 is a low power device that allows computer to computer communication by at least one or more means, namely: (1) land-line phone; (2) circuit switched cellular channel (i.e. it works on first generation analog cell phone channel); (3) cellular digital packet data (CDPD); and, (4) satellite (i.e. data may be transmitted by utilizing low power satellite communications). These four standard means of communication allow the FI 2 to be located wherever. In one of the embodiments, the operating system 12 in conjunction with the communications module 20 will allow the FI system to utilize the Transmission Control Protocol/Internet Protocol (TCP/IP) for all communications with the network architecture for all operations including, but not limited to, well testing and monitoring applications.

TCP/IP is a major communication protocol standard. TCP/IP is actually two separate communications of protocols working in conjunction. An entire family of related protocols is covered in the TCP/IP heading, with TCP and IP as the two main protocols. TCP is partly responsible for breaking data down into packets, as well as reassembling them. The IP part handles how the data packets are transmitted over the network. By using TCP/IP, different computers running in different operating systems can communicate with one another if they all obey this protocol.

As those of ordinary skill in the art will appreciate, the field level Supervisory Control And Data Acquisition (SCADA) systems use a master-slave based communications protocol (e.g. Modbus). In most field monitoring situations, the remote office computer is typically the Master and the field unit is the Slave. This inherently determines how data flows from the field unit back to the office because the Slave can only transfer information to the Host when it is polled. This means that a field unit cannot initiate a notice to the central office when it has an alarm condition.

Using the application layer protocol, discussed in more detail below, the Master-Slave relationship of the prior art can be removed to allow for information to flow asynchronously between the field unit and the central office. This novel system includes the following advantages over the prior art: first, the field unit can notify the central office whenever there is an exception or alarm condition without waiting for the host to poll for it; second, packet based transmission over the wireless network removes the possibility where the field unit radio may malfunction and jam the transmission link for all other units in the line of sight area; third, FI units may be activated to take simultaneous readings on an array of sites. This list was meant to be illustrative.

Figure 2:
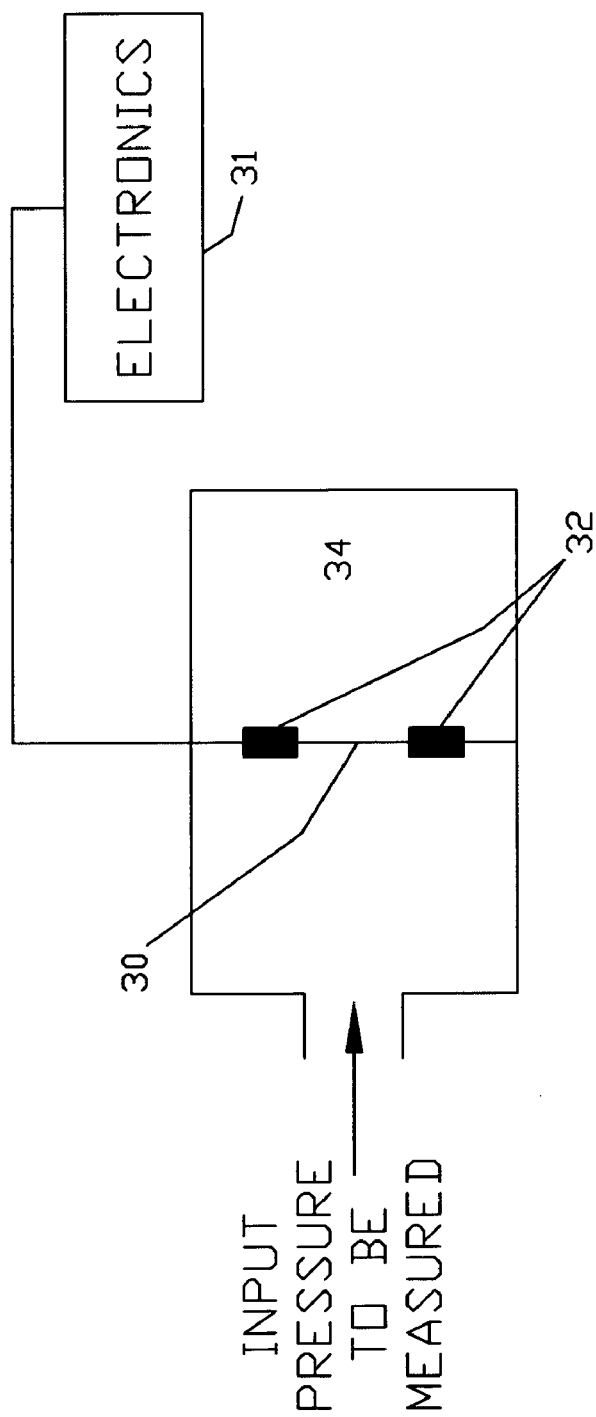
FIG. 2 is a cross-sectional view of a pressure data probe embodiment.

Referring now to FIG. 2, a schematic illustration of a basic pressure sensor 4 will now be discussed. It should be noted that like numbers in the various figures refer to like components. Generally, semiconductor based pressure transducers are commercially available from companies such as National Semiconductor, Motorola, and Honeywell. The pressure sensor 4 of the preferred embodiment, commercially available from Z.I. Probes, Inc., has been modified by incorporating a temperature correction factor algorithm into the operating system. In one of the embodiments, the sensor 4 consists generally of a flexible silicon diaphragm 30 with resistive bridge sensors 32 mounted on the surface. One side of the diaphragm faces a sealed chamber 34 while the other side is made open to an input pressure. Deflection of the diaphragm in turn causes the resistive sensors to produce a signal as is well known in the art. All of the necessary electronic circuitries 31 including the bridge circuit, excitation, instrumentation amplifiers, and other compensation and conditioning circuitry are included.

Figure 3:
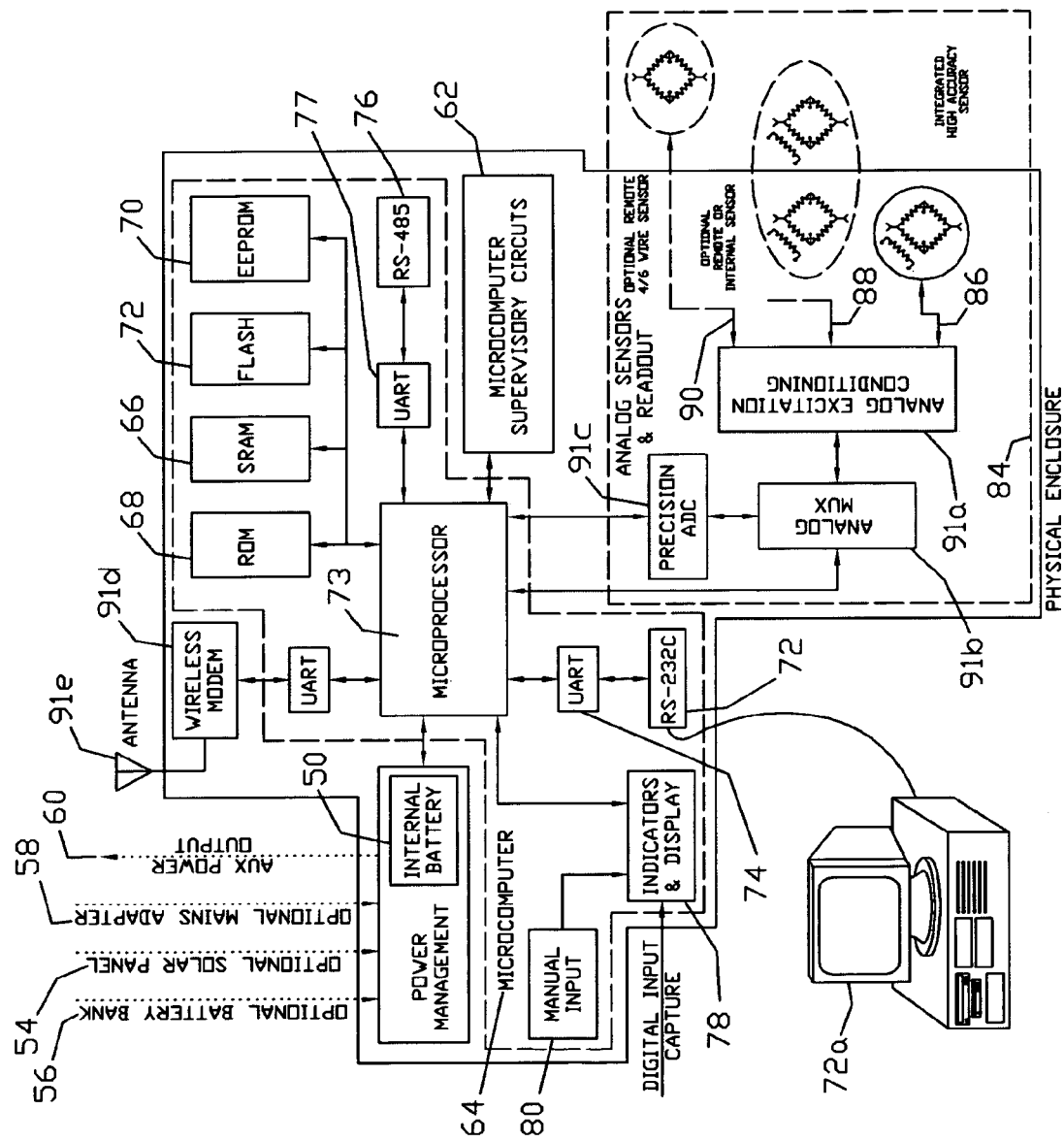
FIG. 3 is a schematic diagram of the hardware configuration of the preferred embodiment.

FIG. 3, which is a schematic diagram of the hardware configuration of the preferred embodiment, will now be described. The power management means 50 includes an internal rechargeable cell 52, which in the preferred embodiment is a Lithium (Li) and/or lead-acid based rechargeable battery. This battery 52 is suitable for an ambient temperature range of −20 degrees C. to +50 degrees C. Some of the features of the power management means 50 will also include battery protection circuit (not shown) which allows for low voltage shut down and protects the battery from deep discharge degradation effects. Also included will be a high voltage clamp that protects the battery from overcharge. Also included in the power management means 50 are circuits for battery cycling and conditioning that ensure that the batteries do not remain at peak charge voltage for extended periods. Smart charger technology is also included that is configurable to allow changes for new battery technology.

As seen in FIG. 3, the hardware configuration also includes external power options. An optional solar panel connection 54 may be included. The design also allows for an optional battery bank 56 to be electrically connected to the power management module. Additionally, a main adapter 58 can be included, with a Universal AC main converter to an intrinsically safe 12 VDC output. The hardware configuration includes an auxiliary power output 60 that is current limited, voltage limited, short circuit proof and ESD (electrostatic discharge) protected.

The hardware further comprises microcomputer supervisory function circuits, generally represented by the numeral 62. The circuits 62 contain a real time clock which is designed to produce interrupts to initiate samples. The circuits 62 also include micro central processing unit clocks that have features of full speed, reduced speed and halt. The circuits 62 further have a power supply monitor, watchdog timers, and system reset functions. The reset functions include resetting on power activation or power interruption, and resetting on certain recoverable system faults.

The microcomputer 64 includes memory storage means that contains the Static Random Access Memory 66, non-volatile Read Only Memory 68, Electrically Erasable Read Only Memory 70, and Flash cache memory 72. The memory means will be electrically connected to the microprocessors 73 (there are 2 processors; the high level microprocessor for computation intense work and the low level for on-going data collection and reduced power consumption) for interaction as is well understood in the art. The SRAM 66 is commercially available from NEC Co. under the name/parts number UPD431000AGZ; the ROM 68 is commercially available from ATMEL Co. under the name AT29C020A; the EEPROM 70 is commercially available from ATMEL under the name AT28C256; and, the Flash memory 72 is commercially available from AMD under the name AM29F032B. The microprocessor 73 is commercially available from NEC Co. under the name (High Level processor) Upd70f3107agj-uen, (Low Level processor) Upd78f9026agb-8es.

A local RS-232C 72 serial port is incorporated into the design that allows for terminal connection detection, port configuration and instrument configuration via a local terminal such as a laptop computer 72a. A Universal Asynchronous Receiver Transmitter (UART) 74 that has a port configuration and means for hardware handshaking is electrically connected to the RS-232C. The UART is commercially available from EXAR Co. under the name XR15C850CM.

A RS-485 serial port 76 is incorporated with proper port settings, hardware handshaking means, and provisions for access to smart sensors and process devices. The RS-485 port allows electrical connection to smart devices such as the digital sensors previously described. The RS-485 port is also electrically connected to a UART 77 which in turn is electrically connected to the microprocessor 73.

Indicator and display means 78 are included which in the preferred embodiment may be a LCD. The LCD is suitable for graphics, digits, etc. to provide rudimentary process data display, setup guidance and error reporting. It is possible to use Light Emitting Diodes ("LED")which emit green, yellow, and red light as "Okay", "Wam" and "Fail" indicators.

Manual input is possible via the manual input module 80 which can be push buttons [under cover] for master reset, simple set up, display configuration, etc. A digital input capture port 82 is included that can monitor signals for state, change of state, timing and counting applications using an external contact sensor.

An analog sensor and readout module is generally represented by numeral 84. The configuration shown has three analog sensor ports arranged, namely 86, 88, 90. The integrated precision pressure port 86 will have one or two channels, contain temperature compensation means, conversion means for converting the signal to engineering units, contain 4/6 wire resistive excitation, and have the ability to measure absolute or differential pressures. An optional remote or internal sensor port 88 is included that has one 4/6 wire excitation sensor, the sensor being typically a moderately accurate process temperature or pressure sensor. An optional remote or external sensor port 90 may be included with one 6 wire excitation sensor being connected. The port 90 may be employed if the second internal port is not used.

The senor ports 86, 88, 90 are electrically connected to the Analog Excitation Conditioning Circuit 91a which in turn is electrically connected to the analog multiplexer 91b. The signal may be directed directly to the microprocessor 73, or as in the preferred embodiment, is directed to the Precision Analog to Digital Converter 91c. The Analog Multiplexer 91b is commercially available from MAXIM Co. under the name MAX4052A. The Precision ADC 91c is commercially available from BURR BROWN Co. under the name ADS1211E. The ADC 91c is electrically connected to the microprocessor 73 as shown in FIG. 3.

A minimum of one sensor of any type is needed for collection of data. As noted above, a maximum of three channels of analog sensors, two of which can be pressure (P) or differential pressure (dP) sensors included with this system. Thus, the integrated analog sensors via port 86 and 88 are high accuracy, 6-wire measurements that allowthe following combinations: P, dP, P+P, P+dP. The external analog sensor via port 88 or port 90 is of moderate accuracy and can be 4-wire, or 4–20 mA type that allows the following combinations: pressure (P), differential pressure (dP), resistive temperature detector (RTD), P+RTD, dP+RTD.

An external contact type of sensor, operatively associated with the digital input capture 82, detects state, change of state, or timing. A remote digital sensor 91 connected via the RS-485 port 76 may also be employed, with this type of sensor being commercially available from a wide variety of vendors.

A compact wireless modem 91d is included. The modem 91d has a UART compatible input and can use CDPD data exchange. The modem 91d has a low power RF output. In the preferred embodiment, the modem 91d is commercially available from Sierra Wireless, Inc. as previously noted. An antenna 91e is shown to transmit data.

According to the teachings of the present invention, one of the possible instrument configurations includes a connection to a hardwired land line telephone network. Additionally, wireless forms of communications may be used that include circuit switched cellular via a telephone modem; a digital terrestrial cellular means that is packet based; or, a digital satellite link means that is also packet based. Another option for the transfer of the data includes use of the RS-232C port 72 to a hand held terminal device or laptop computer.

Figure 4:
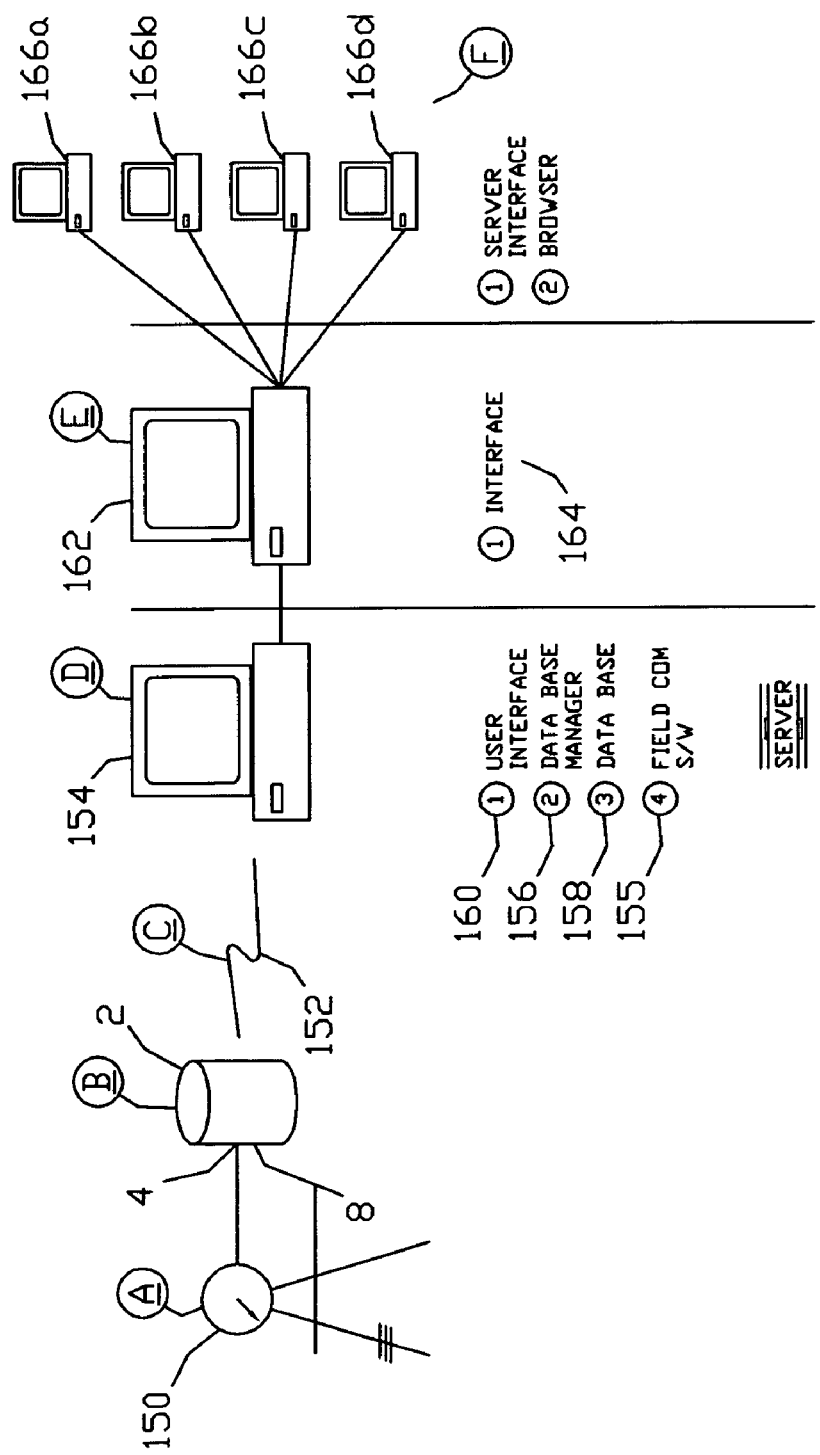
FIG. 4 is a schematic flow chart of a first systems architecture of the present invention.

Referring now to FIG. 4, a schematic flow chart of a first systems architecture of the present invention will now be described. A pressure from any source throughout the oil and gas facility 150 can be communicated to the FI 2. In the preferred embodiment, the pressure is communicated from an oil and gas well 151 completed to a hydrocarbon reservoir. The pressure may be communicated to the FI 2 from down hole, from the well head, from flow lines, from a separator, from a pipeline, process equipment, etc.

In FIG. 4, the pressure from a well completed to a subterranean reservoir has been communicated to the sensor 4 of the FI 2. An analog temperature sensor 8 has also been included. The sensors 4, 8 will collect pressure and temperature data, for instance, and will then transmit that data to the operating system 12 for processing as previously discussed. The operating system will then transfer this data to the field communications module 20, which will be capable of transmitting the digital information as shown in FIG. 3 as numeral 152.

The field communications module 20 will transmit the digital data to a database engine 154 which is commercially available from Oracle Inc. under the name Oracle 8i. The database engine 154 will have loaded thereon field communication software 155 to communicate with the communications module 20. The database engine 154 will consist of a data manager software 156 that is operatively associated with the database 158. In the software context, when it is mentioned that it is "operatively associated with", the phrase simply means that the two components can electronically exchange data between each other. The data base 158 will have a table configuration that will enable the storage of the various data that has been received. Also included will be a user interface module 160 that consist of software that will interface with the server 162 so that the server 162 and database engine 154 can communicate.

The information system's architecture also includes the interface 164 loaded on the server 162. This interface 164 may also be located at the third party's location, or loaded onto multiple user computers 166a, 166b, 166c, 166d. Also loaded onto the third party's computer 166a–166d will be the browser. Thus, at this third party location, the user may access the data base 158.

The database engine 154 may be located at the operator's own site. This allows for security of the data, and control by the operator. Alternatively, the database engine may be physically placed at a third site separate from the operator's site.

According to the teachings of the present invention, multiple FI units may be placed at multiple locations, with the individual FI unit having the field communications module wirelessly transmitting to the data base engine 154. Thus, the database engine 154 will have numerous sensor information stored thereon, from multiple measurement points. Additionally, multiple users can access the database 158 from multiple locations.

Figure 13:
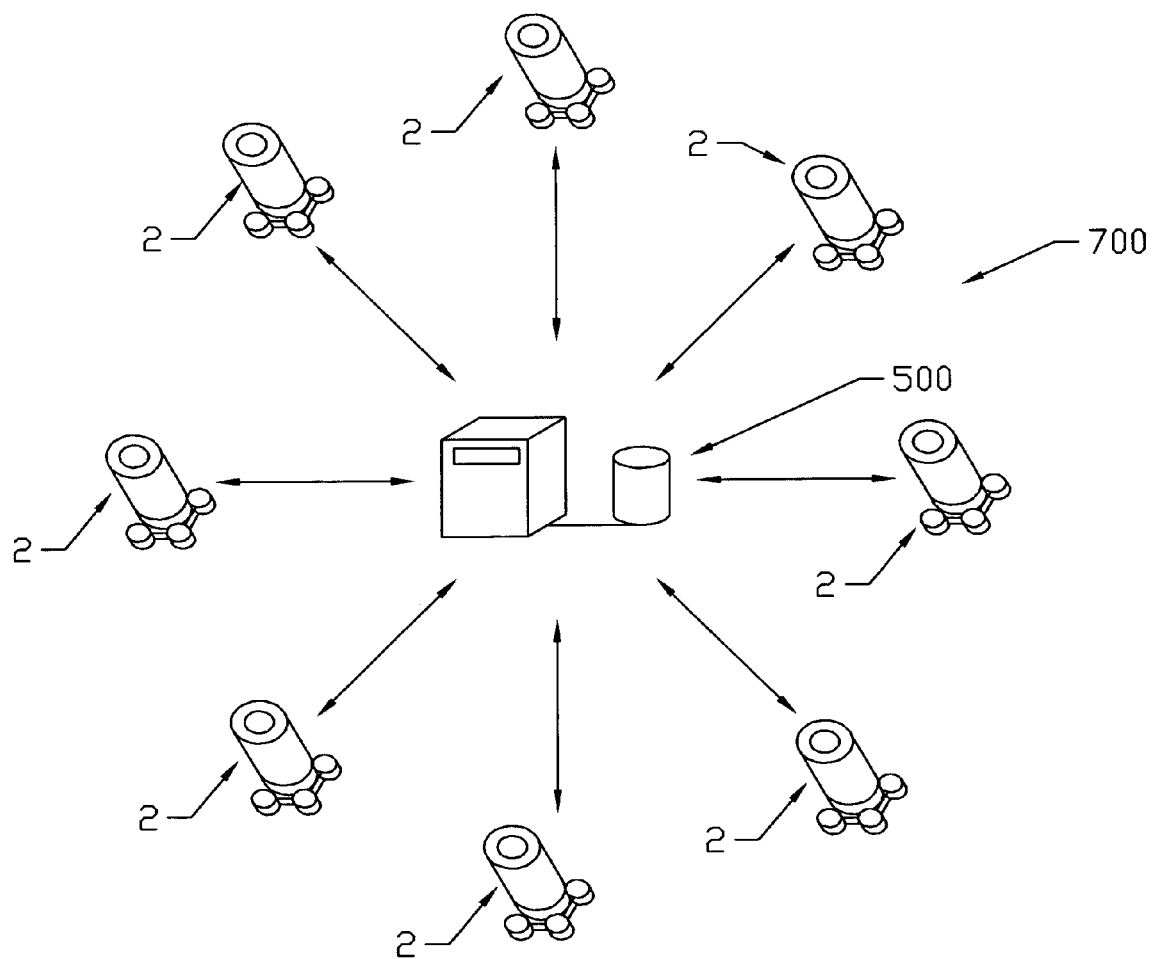
FIG. 13 is a schematic illustration of a system architecture of a further embodiment of the present invention.

FIG. 13, discussed in more detail below, discloses a preferred embodiment to connect multiple FI 2 units. As indicated in FIG. 13, a preferred embodiment, discussed in more detail below, FI units are connected to the central location 500, which can include the data base engine 154, and/or other data bases. The central location 500 can also comprise a similar data base field communication software to communicate with the communications modules 20 of each of the fields units 2.

Figure 5:
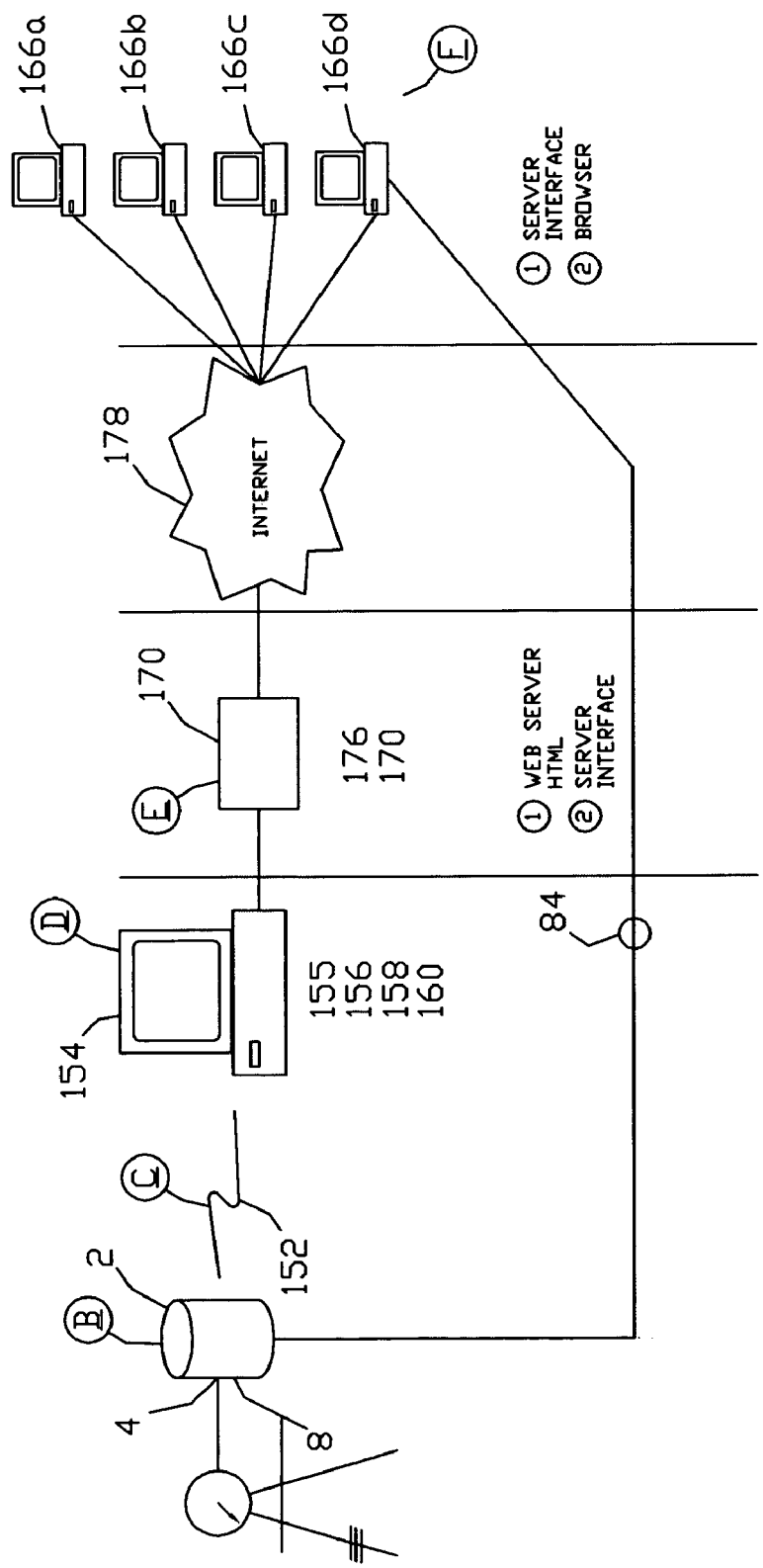
FIG. 5 is a schematic flow chart of a second systems architecture of the present invention.

Referring now to FIG. 5, a schematic flow chart of a second systems architecture of the present invention will now be described. Under this scenario, the pressure from the well 168 will be communicated to the sensor 4 and in turn to the FI 2, which will in turn communicate to the field communication module 20 which in turn is transmitted wirelessly 152 to the data base engine 154. The database engine 154 will have loaded thereon field communication software 155, data manager software 156. The data base 158 will have a table configuration that will enable the storage of the various digital data that has been received. Also included will be a user interface module 160 that consist of software that will interface with the web server 170. A server interface 176 is also included, with the server interface 176 functioning to communicate between the data base engine 154 and a web server 170.

As noted in FIG. 5, there are at least two examples of systems arrangement with this embodiment. First, the server interface 176 may be connected to the Internet 178, which in turn allows the clients 166a, 166b, 166c, 166d, etc. to be connected.

Second, with the teachings of the present invention, it is possible that the field sensors 4, 6 be directly connected to individual clients, such as the client 166d, as denoted by the link 184. This link 184 may be a wireless link, as previously discussed, or may be a phone line, or other conventional means. The operator may wish to have this extra link for security reasons, or to have a back-up system. Regardless of the reason, the architecture allows for this type of arrangement.

FIG. 5 also shows the arrangement for the exception reporting. Thus, the data manager software 156 would allow for the processing of alarm conditions i.e. wherein pressure and/or temperature data exceeds some predetermined level. Thus, there is written into the software a routine that will recognize this exception, and the software will automatically report the exception to the clients 166a, 166b, 166c, and/or 166d as predetermined.

Figure 6:
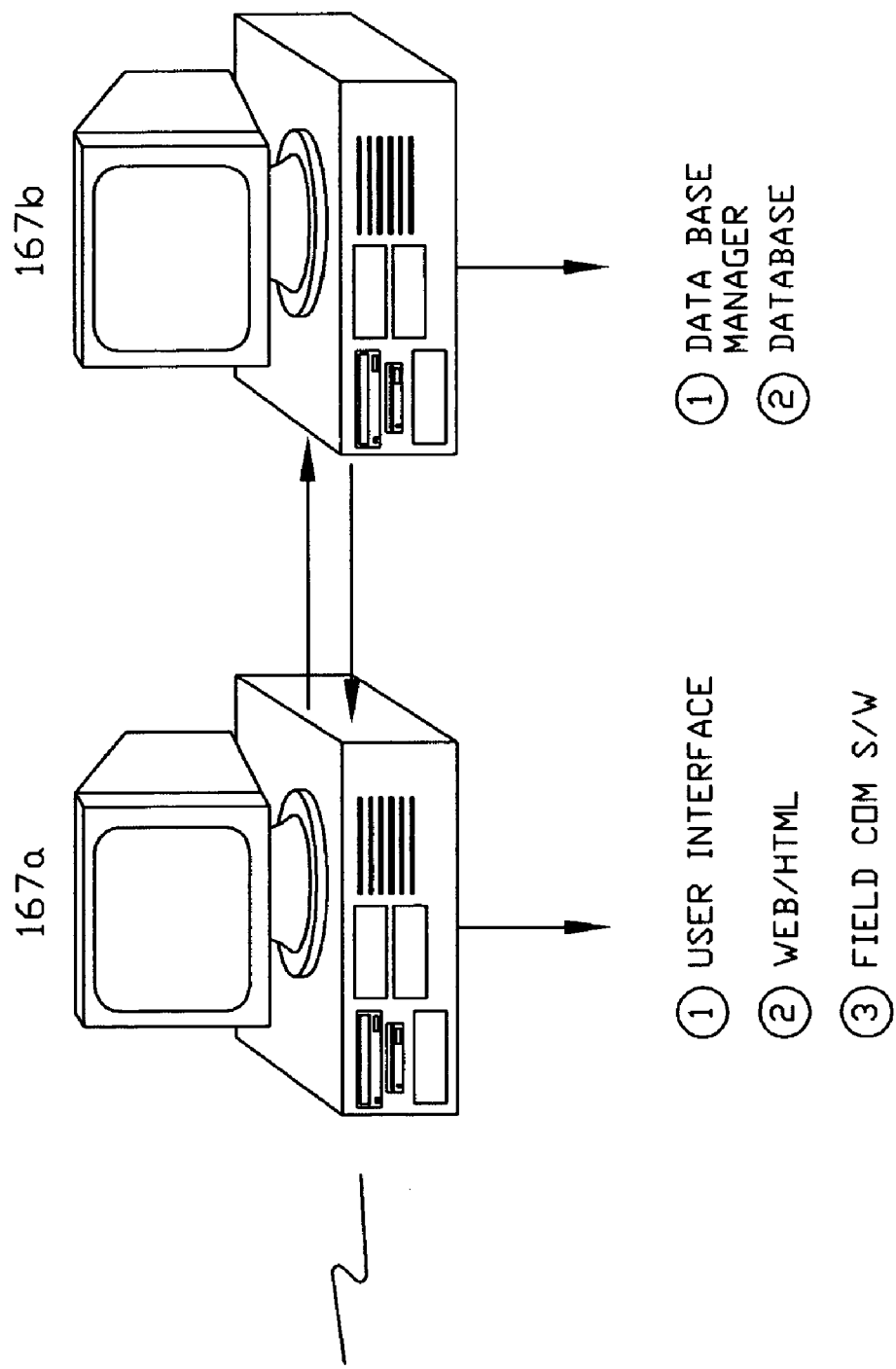
FIG. 6 is schematic diagram of one embodiment of the server arrangement.

FIG. 6 is a schematic diagram of one embodiment of the server arrangement. Thus, a first computer 167a can be used that is electrically connected to a second computer 167b. The computer 167a can have the user interface, hypertext markup language (HTML), Extended HTML (XML) and the field communication loaded thereon. The computer 167b will have the database manager and data base loaded thereon.

Figure 7:
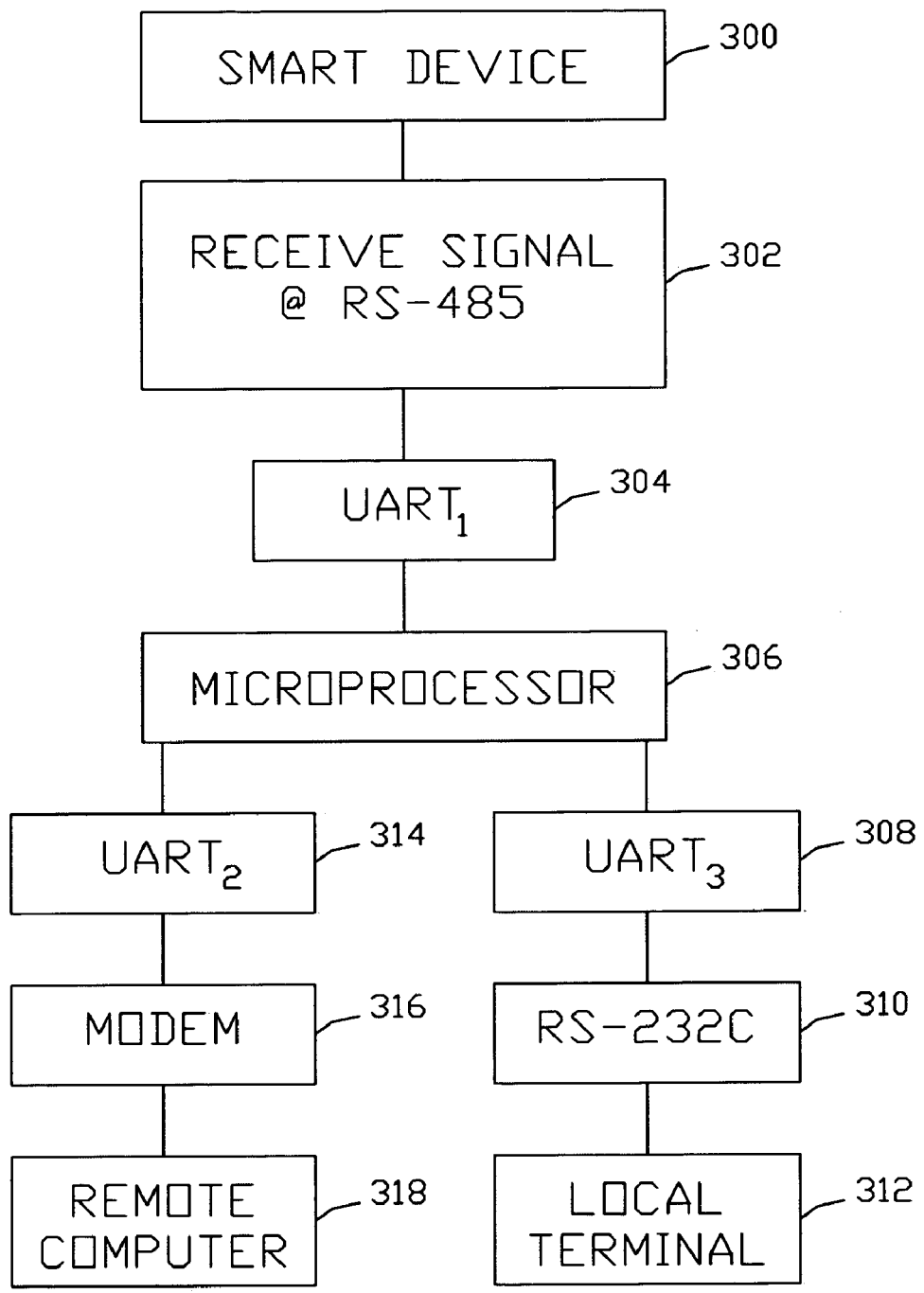
FIG. 7 is a flow chart of the digital signal processing of the present invention.

FIG. 7 is a flow chart of the digital signal processing of the present invention. Thus, the signal from the smart device 300 is received 302 at the RS-485 device 76 which in turn is transmitted to the UART 304. The UART will condition the signal to be accepted by the microprocessor 306. Depending on the mode of operation of the operating system, the microprocessor 306 may then forward the reading to the UART 74 in the step 308 which in turn is sent 310 to the RS-232C 72. The RS 232C 72 allows for a local dump to the local terminal computer 312 where a user can access the collected data on site, for instance.

Alternatively, the mode of operation may dictate that the data be channeled to the UART 314 which in turn will channel the signal to the wireless modem 91, as shown in sequence step 316. The modem will transmit the signal to a remote computer as seen in step 318. From the remote computer, the data may be disseminated via various means such as previously noted with reference to FIGS. 4 and 5.

Figure 8:
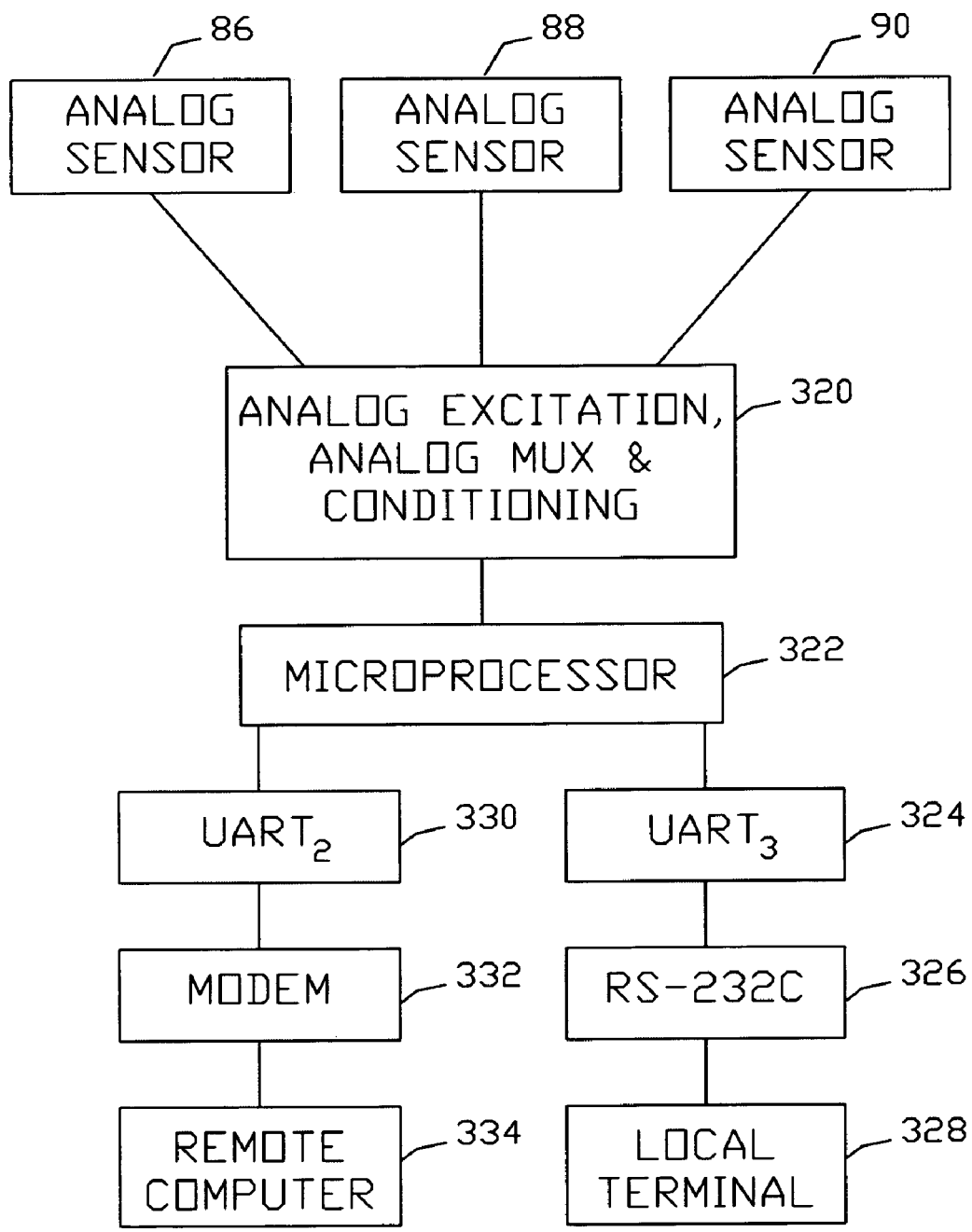
FIG. 8 is a flow chart of the analog signal processing of the present invention.

FIG. 8 is a flow chart of the analog signal processing of the present invention. Thus, the signal from the analog sensor devices 86, 88, 90 are received at the analog excitation conditioning module and analog multiplexer 320 where the analog signal is conditioned and forwarded to the microprocessor in step 322. Depending on the mode of operation of the operating system, the microprocessor may then forward the reading to the UART 74 in the step 324 which in turn is sent 326 to the RS-232C 72. The RS 232C 72 allows for a local dump to the local terminal computer 328 where a user can access the collected data on site, for instance.

Alternatively, the mode of the operating system may dictate that the data be channeled to the UART 330 which in turn will channel the signal to the wireless modem 91, as shown in sequence step 332. The modem will transmit the signal to a remote computer as seen in step 334. From the remote computer, the data may be disseminated via various means such as previously noted with reference to FIGS. 4 and 5.

Figure 9:
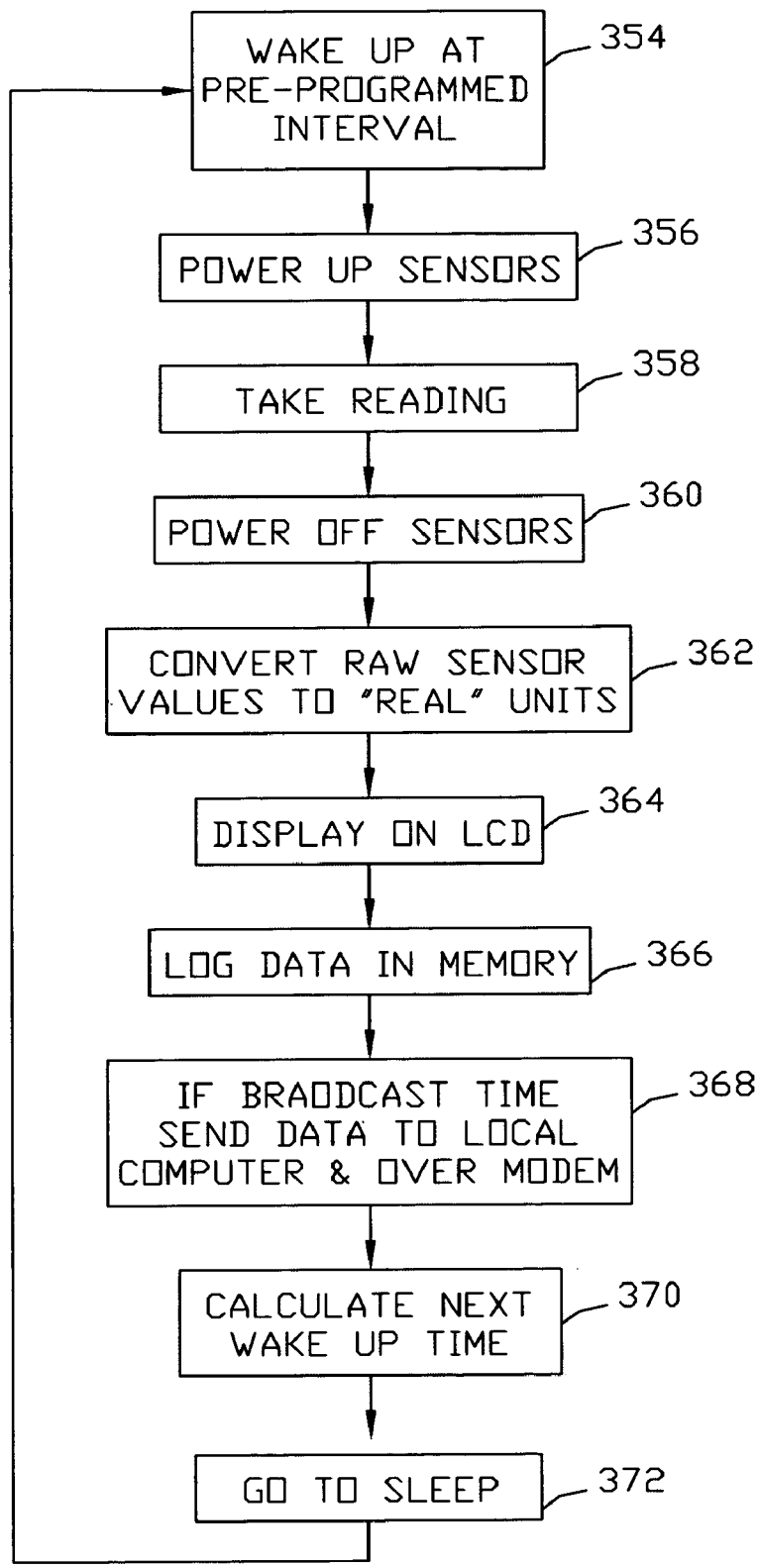
FIG. 9 is a flow chart of the sequence of powering the sensors in order to take readings.

FIG. 9 is a flow chart of the sequence of powering the sensors in order to take readings as well as the sequence of steps of taking a reading. Thus, the operating system generates a wake up signal 354, at a pre programmed time interval, which will cause the sensors to be powered up 356. The sensors will take a reading, as denoted in block 358. The operating system will then cause the sensors to be powered off 360.

Thereafter, the operating system will convert 362 the raw sensor values, stored in the cache memory, to real units utilizing a conversion algorithm as previously stated. The converted readings will then be displayed 364 on the LCD. The converted data is stored into the memory 366. The operating system will determine the next broadcast time point, pursuant to a predetermined time interval, and at the broadcast time, the field instrument (via the communications module) will send the data to a local computer and over the modem 368. The operating system will then calculate the next wake up time 370 and thereafter generate a signal which causes the sensors to power down 372(referred to as sleep). After the expiration of the predetermined time interval, a wake up signal is generated thus generating the loop back to the step seen in block 354, with the steps being repeated as shown in FIG. 9.

Figure 10:
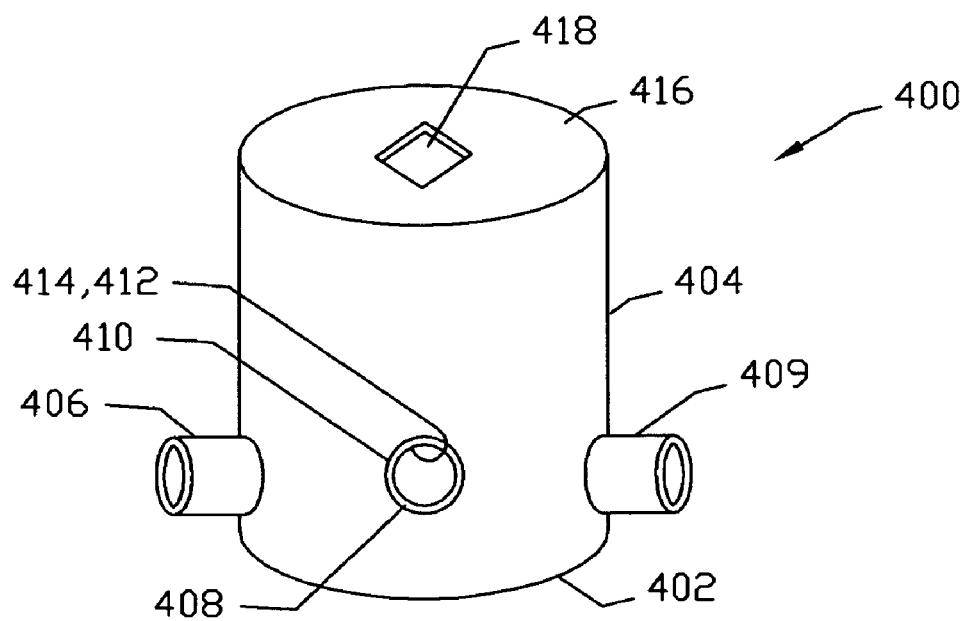
FIG. 10 is a schematic illustration of an enclosure of the present invention.

Referring now to FIG. 10, a schematic illustration of the enclosure 400 of the present invention will now be described. In the preferred embodiment, the enclosure 400 includes a generally cylindrical base 402 that has an outer cylindrical surface 404 that in turn has extending therefrom four projecting openings (only openings 406, 408, 409 are shown in FIG. 7). The openings are generally cylindrical in nature and will have an outer diameter 410 that extends to the inner diameter 412. The inner diameter 412 will have connection means such as an internal thread means 414 that will sealingly engage with an adapter having mating thread means. All four openings will have similar internal thread means. O-rings may be used to aid in sealing. Other connection means include use of pins as well as welding adapters in place. As seen in FIG. 10, the base contains a top 416 with an opening for placement of the LCD 418.

The Liquid Crystal Display (LCD) 418 is also shown, with the LCD being electrically connected to the printed circuit board. The LCD is electrically attached to the digital pressure readout as previously stated. Thus, the operator can view the digital pressure readout utilizing the enclosure 400. The LCD 418 is a custom layout available from Varitronix Ltd.

Therefore, the enclosure 400 is a closed container once the adapters have been placed within the openings. This enclosure 400 represents an explosion proof closed container. As will be understood by those of ordinary skill in the art, hydrocarbons can be hazardous and/or corrosive materials. In accordance with the teachings of the present invention, the pressure from the wells will ultimately be communicated to the sensor within the openings. An important aspect to the invention is to withhold pressure from the inner chamber 229. Additionally, the inner chamber 420 will house the printed circuit boards for the sensor, memory, operating system, modem, battery, etc. Thus, the enclosure must also be capable of withstanding an internal blast. Remember, hydrocarbon fluids and gas are extremely flammable with low flash points.

Figure 11:
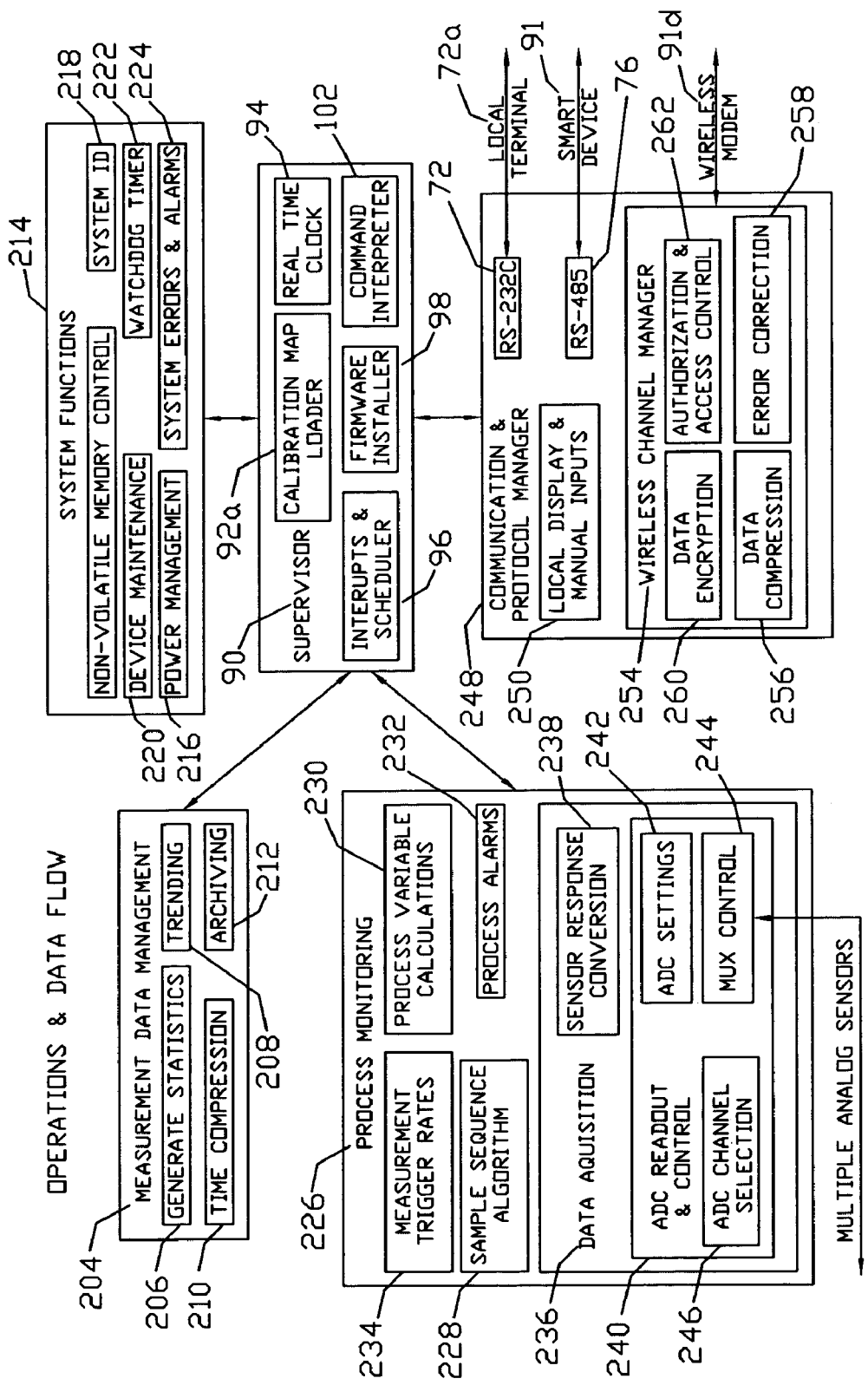
FIG. 11 is an operations and data flow chart of the preferred embodiment.

FIG. 11, which is an operations and data flow chart, will now be described. In particular, FIG. 11 depicts the system software & firmware of the operations and data flow. The operating system contains a supervisor means 90 which technically contains the hardware circuit 62 from FIG. 3. The supervisor means 90 also contains additional firmware that includes a calibration map loader means 92*a* for precision pressure maps, RTD (resistive temperature detector) calibrations, and special purpose calibrations for custom sensors on the external analog input channel (i.e. 4–20 mA conversion). Also included is the real time clock means 94 that will be continuously powered. The real time clock 94 has a programmable delay to the next microprocessor interrupt for data sampling.

The supervisor 90 further contains the interrupts and scheduler 96 for data sampling. The firmware installer 98 contains a boot loader that can be accessed via the local terminal or via the remote communication channel. The command interpreter means 102 is included and contains means for providing the sensor configuration, power management configuration, RTC configuration, UART configuration, memory configuration, display configuration and allows access to raw sensor values, process values and various intermediate calculation results.

The measurement data management module 204 is electrically connected to the supervisor means 90. The measurement data management module 204 includes means 206 for generating process statistics and higher level calculations done on process variable calculation results. The measurement data management module 204 will also contain means 208 for trending, and means 210 for time compression. Some level of statistics and process data can be kept for some period of time including the lifetime of the device. In the preferred embodiment, the oldest data will get compressed the most, while the most recent data is saved at higher resolution (both time and amplitude). Additionally, means 212 for archiving the data is provided.

The supervisor will be operatively connected to the system functions module 214. The system functions module 214 includes the power management means 216 that allows for switched modem power, switched analog circuit power, and in some cases switched external power. Also included will be system identification 218 that will digitally contain information such as serial number, production lot, hardware and firmware revision codes, model number, build date and factory, original configuration, current configuration, first day placed in service and other similar data.

Additionally, a device maintenance means 220 that includes maintenance logs, with the logs containing the last service date, operator and record locator number; last calibration date, calibration source, calibration ID and current calibration status; enclosure access logs that detail when the enclosure has been opened and detect that service was performed, and detect if tampering has occurred. The device management 220 will also update the maintenance history and run-time operating statistics.

The device management 220 has preventative maintenance indicators that include count down clocks, etc. to notify of upcoming preventative maintenance sessions. Additionally, there are checks for battery maintenance/replacement that may indicate when battery charge is low, the batteries are old, or won't recharge properly.

A watchdog timer means 222 has been included. The systems functions module contains a non-volatile memory control that will have a cache memory and EEPROM memory. A system errors and alarms means 224 is included that indicates if the error is recoverable during a current session, or recoverable on the master reset, or recoverable only with physical intervention. Another feature is that the system will have checks and diagnostics activated on startup, a system for performing self-checks/diagnostics, and a monitor for the status of the RTC (real time clock). Means for monitoring internal analog points is included. These checks are triggered on power up, or manually, or through the local terminal connection, or remotely through the wireless connection. System warnings and error alarms are produced out of the communications ports when a diagnostic fails or receives a suspicious value. The system logs these error/exceptions, and a local error history record is kept in case of outgoing alarms are missed.

Another module of the operations and data flow is the process monitoring module 226. The module 226 includes a sample sequence algorithm 228 which determines when and how to shift between various sample rates, trigger modes, calculations and data analysis. Thus, the process data sampling options include scheduled sampling where process values are determined at a suitable rate on a fixed or sequenced schedule. Typically, this sampling is used when the process values vary slowly or not at all. Also available is adaptive sampling wherein process values are determined at a dynamic rate determined by the recent history of the process. The adaptive sampling is typically used when process values vary erratically.

The process monitoring contains process variable calculation means 230 that allows for AGA 3 or AGA 8 and API "Standard" gas-fluid calculations that provide for material composition correction. The calculation means 230 includes various fluid characteristics, tables, and equations and may contain orifice meter device descriptions (materials, dimensions, specific ID's, etc). Among the process data calculation options are the ability to obtain current values and states for the process and system. Additionally, the history of values and states for the process and system can be obtained. This history can be used to determine process statistics such as the maximum, minimum, average, total, etc. of the parameters thus measured.

Also included in this module is the process alarm means 232 that is based on captured, converted and combined signals from both local and (if installed) remote sensors. The process alarm means 232 may use default or predefined process monitoring algorithms and alarm conditions or user defined algorithms and logic. This module will notify of an alarm condition through the display and will send a message out the RS-232 and wireless ports.

The measurement trigger rates means 234 has single, multiple and/or auto-repeating sequences that may be combined in larger sequences using various process dependent algorithms. Means 234 contains adaptive and conditional sampling methods that include process variable triggered sequences and sampling rate changes. The triggers may be derived from process variables, proportional, rate, derivative, integral and state inputs. The sampling methods include remotely triggered sequences and sampling rates, and allow remote commands to force branches within sequence logic.

Another module is the data acquisition 236 that includes a sensor response conversion 238. For the high precision pressure sensors, an iterative interpolation is used across a pressure-temperature map until convergence. For other simple sensors, an appropriate 1-D conversion may be used to compensate the sensor's transfer function. A ADC readout and control 240 is provided that allows for ADC settings 242 and MUX control 244, that is connected to multiple analog sensors, and ADC channel selection 246.

A communications and protocol manager module 248 is also included that allows the operator to select appropriate data representation and protocol for communication channels. An RS-485 port 76 is included that may be connected to the external smart sensors, or may be connected to other control systems, or may be connected to alarm functions, or may be connected to process monitoring. The RS-232C port 72 is included which allows for a local terminal access to the command interpreter 102. The RS-232C allows for local data retrieval, optional periodic quality control and calibration access, optional firmware update access, sensor configuration, hardwired configuration, local diagnostics and debug access.

A wireless channel management means 254 is included that contains data compression means 256, error correction means 258, data encryption 260 and means for authorization and access control 262. Data encryption is commercially available from several vendors and the data encryption means may use the Data Encryption Standard (DES). Data encryption means 260 is commercially available from RSA Data Security Inc. under the standard RC-4 and RC-2, and both of these are covered under the standard CDPD 1.1, which the wireless modem uses.

Compiled data may be extracted through the local terminal port by a service technician. The data can then be manually carried to data management facility. This data dump mode is used primarily as a back-up if the remote data dump mode is inoperative or unreliable.

Figure 12:
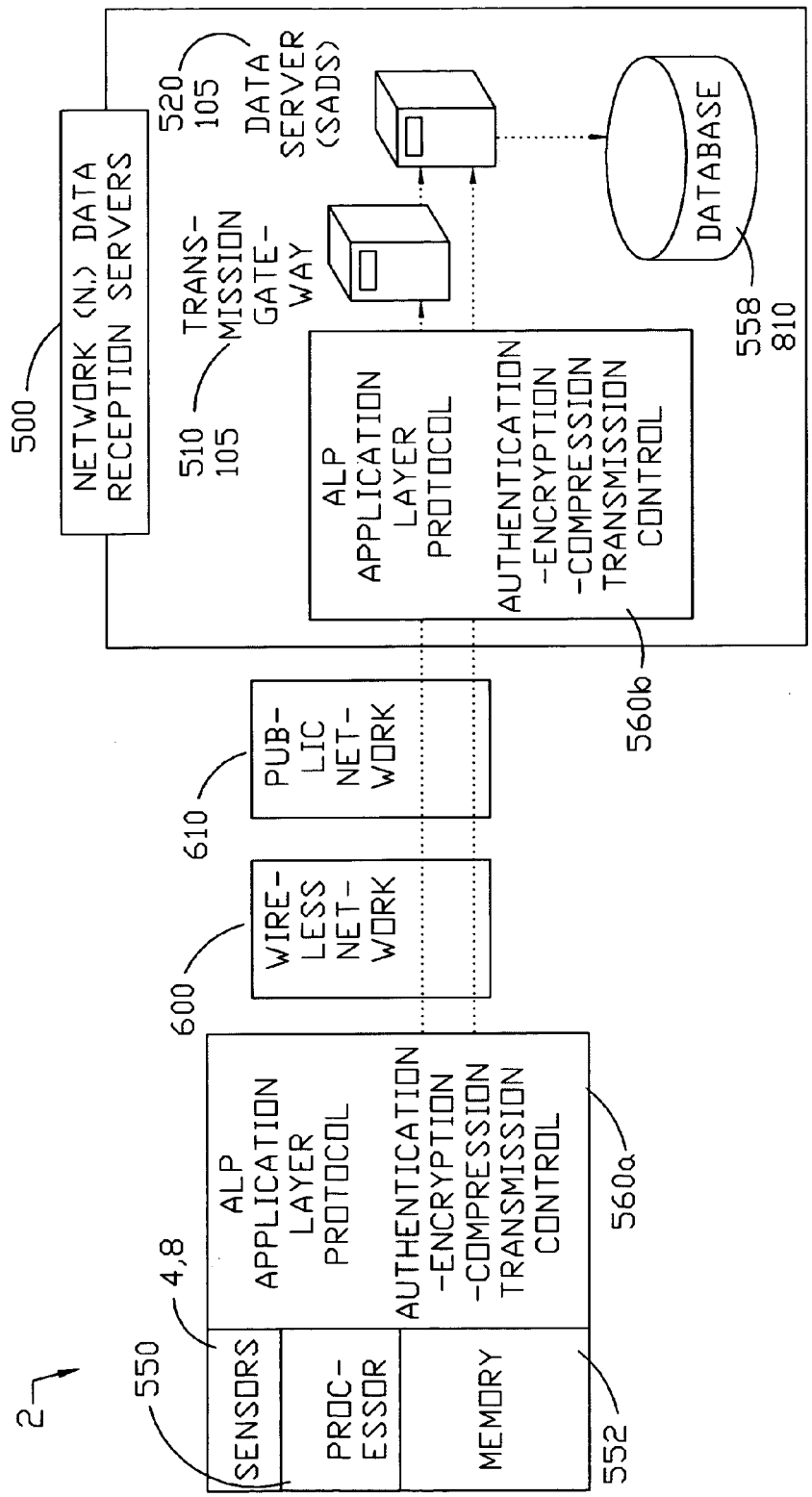
FIG. 12 is a schematic diagram of the hardware architecture of a preferred embodiment.

FIG. 12 is a schematic diagram illustrating the hardware architecture of a preferred embodiment of the system. As illustrated in FIG. 12, the system comprises the field unit FI 2 connected to the network data reception servers, located at central location 500.

The field unit FI 2 comprises the elements discussed above and illustrated, for instance, in FIG. 1. In particular, the field unit FI 2 may comprise sensors 4, 8 as well as a processor 550 and memory 552. In this way, the field unit FI 2 can complete the steps described above, including those illustrated in FIG. 9. In particular, the processor 550 can power up the sensors 4, 8 take the reading and log or store the data corresponding to the readings in memory 552. In addition, the processor 550 interacts with the application layer protocol 560 to communicate the data indicative of the reading to the central location 500. This communication can occur through a wireless network, shown generally by reference numeral 600, a public network, shown generally by reference numeral 610, or any other type of network or combination of networks which can be used to transmit data. In other words, it is understood that while the present invention is described with respect to specific types of networks for communicating data and/or commands for specific types of protocol, the invention is not necessarily limited to any one type of network topology or any one type of transport protocol.

In order to facilitate the transmission of the data, the application layer protocol 560 generally has two components, namely a component 560*a* located at the field instrument unit FI and another component 560*b* located at the central location 500. In this way, data transmission can be accomplished between the data reception servers at the central location 500 and one or more field units FI 2 located at remote locations with respect to the central location 500.

As illustrated in FIG. 12, the application layer protocol 560 can perform the necessary steps to transmit the data. For instance, the application layer protocol 560 can assist in authenticating the data, encryption of the data and compression of any data. In other words, the application layer protocol can assist in all transmission control features. The application layer protocol 560 may reside or form part of the other means referred to above, such as the data compression means 256, the error corrections means 258, the data encryption 260 and the means for authorization and access control 262, or, may be a separate single unit which performs these functions. The application layer protocol 560*a,b* may also be associated with, or reside in the communication units or modules 20, 91*d* in the field instrument F12 and the central location 500, respectively. The application layer protocol 560*a* may also reside in the software component of the microcomputer 64.

The application layer protocol 560*b* located at the central location 500 receives the data, de-encrypts the data if necessary, and authenticates the data using standard error detection and correction techniques. The central location 100 then has a transmission gateway 510 comprising transmission gateway servers. The transmission gateway servers may convert data received from the field units FI 2 to a form which can be used and/or stored at the central location 500. In a further embodiment, some data may pass directly to the central location 500 depending on the transport protocol and carrier network topology selected by the system designer in view of the communication module 20 installed in the unit FI 2. The transmission gateway 510 is connected to the data server 520 which accepts incoming data and, assuming the data is successfully authenticated and validated, submits the data indicative of the readings for insertion into the data base 558. The data base, through the data base server or engine, acts as a central repository for the readings from all of the sensors 4, 8 of each of the field instrument sensors FI 2. The data base 558 will store the readings from each of the sensors 4, 8 identifying the sensor 4, 8 and the corresponding field unit FI 2, which made this the reading. The data base 558 may also store other information such as environmental information including the times the readings were made.

It is apparent from FIG. 12, that the application layer protocol permits communication to and from the data reception service at the central location 500 and each of the field instruments FI 2. In particular, by having the application layer protocol 560*a* at field unit FI 2 and the corresponding application layer protocol 560*b* at the data reception servers of the central location 500, data, instructions, and commands can be transferred between the data reception servers at the central location 500 and the field instrument units FI 2 located remotely therefrom.

Information can be transmitted between the application layer protocol 560*a* at the field unit FI 2 and the application layer protocol 560*b* at the data reception servers of the central location 500 by any known means. However, in a preferred embodiment, the application layer protocol 560 communicates information through the use of messages. Messages may consist of a header and body which may have the following format:

| Message Type | Message Subtype | Type & Subtype Version | Error Code | Transaction ID | Message Length | Reserved |
|---|---|---|---|---|---|---|
| 1 byte | 1 byte | 1 byte | 1 byte | 2 bytes msbyte=index lsbyte=instance | 2 bytes | 2 bytes |

The header may be followed by N bytes of message data. The format of this data is dependent on the message type, subtype, and version. Any unused fields are generally set to zero.

There can be many classes of messages. For example, the messages may include command messages which are sent from an initiator, such as a laptop computer or a server or a computer located at the central location 500, to request data, or an operation, from a target such as a field instrument unit FI 2. Messages may also include response messages which are sent back from the target, such as the field instrument FI 2, to the initiator.

There may not be a one to one relationship between the commands and the responses. For example, some commands may not require a response, but rather may send instruction to the processor 550 at a field instrument unit FI 2. Furthermore, some commands may trigger multiple responses. In order to track the responses, the transaction ID field may be used as a counter which increments for each new command transaction initiated by an initiator. A transaction may consist of one message of several messages. The transaction ID is returned by the target of a command back to the initiator in all responses to that command. This is a potentially simple means to match responses to commands by parsing the message header.

The transaction ID may also consist of two sub-fields, namely a value and a instance. The value sub-field increments for each new command transaction. There is an unsigned value with zero reserve to indicate messages that are not tied to a transaction, such as broadcast messages. Hence the range of indices for a transaction ID is from 01 to FF in hexadecimal notation. The instance sub-field is used to denote the specific part of the transaction such as the start of transaction, end of transaction, etc. This may be assigned a value with zero indicating the last message of a transaction, positive numbers indicating the number of remaining messages in the transaction, negative numbers indicating both the first message of the transaction and the remaining number of messages in the transaction. Accordingly, for commands which elicit multiple responses, the transaction ID for each response will be identical.

With respect to other fields which may exist in the message header, it is apparent that the message type field defines a major class of the message such as command or response. The message header may also identify the target and/or initiator to facilitate in transferring information. The error code field is generally used for responses only and to assist in error detection and correction. The message length field indicates the length of the entire message including the header. The last two fields may be reserved for future use. One advantage of using this message format is that information can be transferred between the field instrument unit FI 2 and other components in the network, such as the network data reception servers at the central location 500 or a laptop, server or other computing device located in another location, even if the internal functions and data representations are not compatible with each other. In other words, a further function of the application layer protocol would be to act as a universal translator to enable all the components in the network to communicate with each other.

As stated above, the field unit FI 2 can be polled for the data when the data reception servers at the central location 500 desire the data. The polling may occur after the field instrument unit FI 2 begins a connection to the central location, or, in a preferred embodiment, could be instigated by the central location. In this way, command signals can be sent from the central location 500 to a specific field unit FI 2 in order to cause the field unit FI 2 to perform a measurement and transmit the data back to the central location. In addition, the data reception servers at the central location 500 can send command signals to a specific field instrument unit FI 2 to cause the processor 550 to store command signals indicating the time and type of reading which should be made. The processor 550 can make the reading at the specific time and transmit the data back to the data reception servers at the central location 500, when the readings are made, or alternately, store the data at the memory 552 located remotely at the field instrument unit FI 2. The processor 550 may process the raw data received from the sensors 4,8 and transmit the processed information to lower data transmission volume, as discussed in more detail below.

In a further preferred embodiment, the remotely located field instrument FI 2 can determine the status of the network, such as the wireless network 600 and the public network 610, as well as determine the status of the data reception servers at the central location 500. If any one of these components is not operating optimally or is congested, the processor 550 at the field instrument FI 2 can store the readings at the memory 552 and then automatically try to retransmit the data at a later time.

In a further preferred embodiment, the field instrument FI 2 are autonomous, meaning that they can automatically initiate a connection to the data reception servers at the central location 500. For example, once a the field instrument unit FI 2 is initially activated, they can autonomously and automatically notify the data reception service at the central location, of this fact. Likewise, if a particular field instrument unit FI 2 is temporarily disconnected from the data reception servers at the central location 500, for whatever reason, including a temporary failure of a component of the field instrument unit FI 2 or of the network, such as the wireless network 600 or public network 610, the field instrument unit FI 2 can send a signal advising the data reception servers at the central location 500 that it is now operational. Furthermore, the field instrument unit FI 2 can at that time transmit any data representing readings made during the down time, and, indicate the time the readings were taken.

For example, once the field instrument unit FI 2 is initially activated, or, if it is activated after a temporary interruption or a catastrophic favour, the field instrument unit FI 2 may either receive a signal from the central location 500, or, send a signal to the central location 500 indicating its presence. In either case, the initial signals will transmit information to set up or initialize the field instrument unit FI 2 into the network. This information may include information identifying the field instrument unit FI 2, and, setting the date and time of the field instrument unit FI 2, or, confirming that it is the same as the date and time of the network data reception servers at the central location 500.

Accordingly, it is apparent that the system disclosed in FIG. 12 has a high degree of robustness in that it can survive a failure of any one of the components in the system, including the network, such as the wireless network 600 and/or public network 610, as well as a temporary failure in either the data reception servers at the central location 500 or a component of the field instrument unit FI 2. In particular, if the processor 550 at a field instrument unit FI 2 has been pre-programmed to take readings at specific times, it will continue to do so even if there is a failure in other components of the system and the data representing the readings cannot be transmitted to the data reception service at the central location 500. Rather, the processor 550 will store the time, date and readings locally at the memory 552 until such time as the network can transmit the data and the data reception servers at the central location 500 can receive the data. The field instrument unit FI 2 can also reassert autonomously and automatically their existence, either initially when they are first connected to the data reception server at the central location 500, or, offer a temporary interruption or catastrophic failure.

Clearly, this provides an advantage particularly in the embodiment where this system is being used near hydrocarbon fluid and gases which are extremely flammable with a low flash point. For example, should a catastrophic explosion occur, and the field instrument unit FI 2 is not directly affected by the explosion, it can continue to take readings and store them locally at the corresponding memory 552. This data, when the field unit FI 2 is later reconnected either to the previous data servers at the central location 500, or if this central location 500 has been irreplaceably destroyed, to a new central location 500 and new data reception servers, the field instrument unit FI 2 can transmit data representing the readings made during the down time of the system to re-populate the database 558. These readings could be instrumental in determining the cause of any catastrophic event and/or assisting a design change in the future to avoid such catastrophic events.

FIG. 13 illustrates schematically the system architecture for a preferred embodiment employing a star network, shown generally by reference numeral 700, for monitoring and data collection from a number of remotely located field instruments 2. The field instruments 2 are configured to transmit data, and may be of an identical construction such as that described as the pressure instrument FI 2 with reference to FIG. 1. More preferably, however, the instruments 2 are adapted to sense and provide data respecting a variety of differing operating conditions over a given geographical region or oil and gas installation.

As discussed above, if the central location 500, and/or one or more of the field units FI 2 are damaged in a catastrophic event, the remaining field instrument units FI 2 will continue to take measurements and store them in the local memory 552, pursuant to their previously received instructions. Therefore, the system illustrated in FIG. 13 will continue to operate, and in particular the field instrument unit FI 2 will take readings and store them locally at memory 552, for later transmission to the central location 500 should the network be congested, or a failure has occurred either temporarily of the network or the data reception service at the central location 500, or, a larger catastrophic event.

In addition, as stated also with respect to FIG. 12, the star network 700 can transmit over a wireless network 600 and/or a public network 610, or any other type of network for communicating data and/or commands. Accordingly, it is understood that while the present invention is described with respect to specific types of networks for communicating data and/or commands, it is not necessarily limited to any particular of network, or, any one type of protocol. Furthermore, it is understood that the networks, described herein, and in particular the star network 700, can be mapped out across one or more various sub networks, such as the Internet, the Public Switch Telecommunication Network (PSTN), Cellular Digital Pocket Data (CDPD) and Satellite networks including Iridium networks.

Accordingly, the present invention is independent of the networks upon which it is operating. In other words, one or more various sub-networks, such as the Internet, the PSTN, CDPD and Satellite networks can be used. Furthermore, the invention can accommodate ongoing sub-network changes which will inevitably occur as these various sub-networks, and new sub-networks, continue to improve and change.

To map across multiple networks or sub-networks with different topologies instructions, unique application layers and section layers may be added in the communication system to ensure the connection from each of the field instrument units 2 to the central location 500. It is also understood that different field instrument units 2 may use different sub-networks, or combinations of sub-networks, to communicate to the same central location 500. Accordingly, the network of the present invention, such as the star network 700 as illustrated in FIG. 13, can map itself over the networks shown below:

|  | CDPD | Iridium Satellite | Internet |
|---|---|---|---|
| Network Topology | Star | Star | Bus |
| Network Structure | Client/Server | Client/Server | Peer to Peer |

As indicated above, different network structures may be used in order to communicate information in the network 700. In a preferred embodiment, where the network topologies is a star network 700 as illustrated in FIG. 13, the network structure is a client/server structure. In such a structure, the client is generally understood to initiate the connection between the client in the other element in the network, generally referred to as the server. In this structure, the client will decipher the input it receives and determine the process that will be executed by either the client or the server. If the required process is to communicate with the server, then the client will do so. If the required process is to be performed by the server, the client sends the request to the server. Likewise, the definition of a server is generally the entity and the network 700 which authenticates a client requesting a response and service from the server. The server often stores data for the process and sends data to the client when required. The server may also store a program module for the client and serve up the program to the client on demand. One advantage of the network shown in network 700 is that either the network data reception servers of the central location 500 or any one of the field instrument units FI 2 can act as the client or server. Having interchangeability of the client and server functions in the star network 700 increases the versatility of the system. In particular, depending on the task to be achieved, the functions promptly change to achieve the desired task. This also increases the robustness of the network 700 by permitting the field instrument unit FI 2 to act as client after a temporary malfunction or catastrophic failure.

In addition, the star network 700 can survive, by design, in spite of the total failure of the central location 500. The field instrument units FI 2 are equipped with the alternate central location in its memory so that FI 2 will automatically switch the address vector. When the field instruments F12 finds the active alternate central location 500, F12 will automatically repopulate the alternate central location 500 by filling the missing data.

Furthermore, an added advantage of the interchangeability of the client and server function between the field instrument unit FI 2 and the network data reception server at the central location 500 is the ability to parrell process data throughout the network 700. In other words, as described above, the processor 550 at each field instrument unit FI 2 can be instructed to execute programs independent of the other elements in the network 700, including the network data reception servers at the central location 700. Consequently, each processor 550 at each remote location can execute programs simultaneously. This allows for a large-scale parrell processing at the network level for the purpose of data delivery. This is facilitated by the interchangeability of the client and server functions between the field instrument unit FI 2 and the data reception servers at the central location 500. For example, if the processor 550 at the remote locations are instructed to process the raw data and transmit processed information, this can greatly decrease the processing requirements placed on the network data reception servers at the central location 500, and, can lower the data volume transmission across the entire network 700. This is an advantage over a master-slave base communication protocols, such as the supervisory control and data acquisition and (SCADA) systems which do not provide for autonomous operation of field instrument units FI 2.

It is further understood, as also discussed above, that while the supervisory control and data acquisition (SCADA) systems use a master-slave base communication protocol the present invention does not necessarily require such a relationship, and, such a relationship is explicitly removed if a network, such as the Internet, is utilized with the TCP/IP protocol. Likewise, while the star network 700 topology typically uses a client/server relationship where the client initiates the connection between the client and server and a server authenticates a client requesting a response or service from the server, the star network 700 is not necessarily restricted to such an arrangement. Rather, the star network 700 could have interchangeable client and server function. In other words, as discussed above, data and commands can be interchangeably sent from the field instrument units FI 2 to the central location 500, in spite of the star network 700. In other words, and depending upon the task to be achieved, the field instrument units FI 2 and the network data reception servers at the central location 500 may change functions to achieve the desired task.

Figure 14:
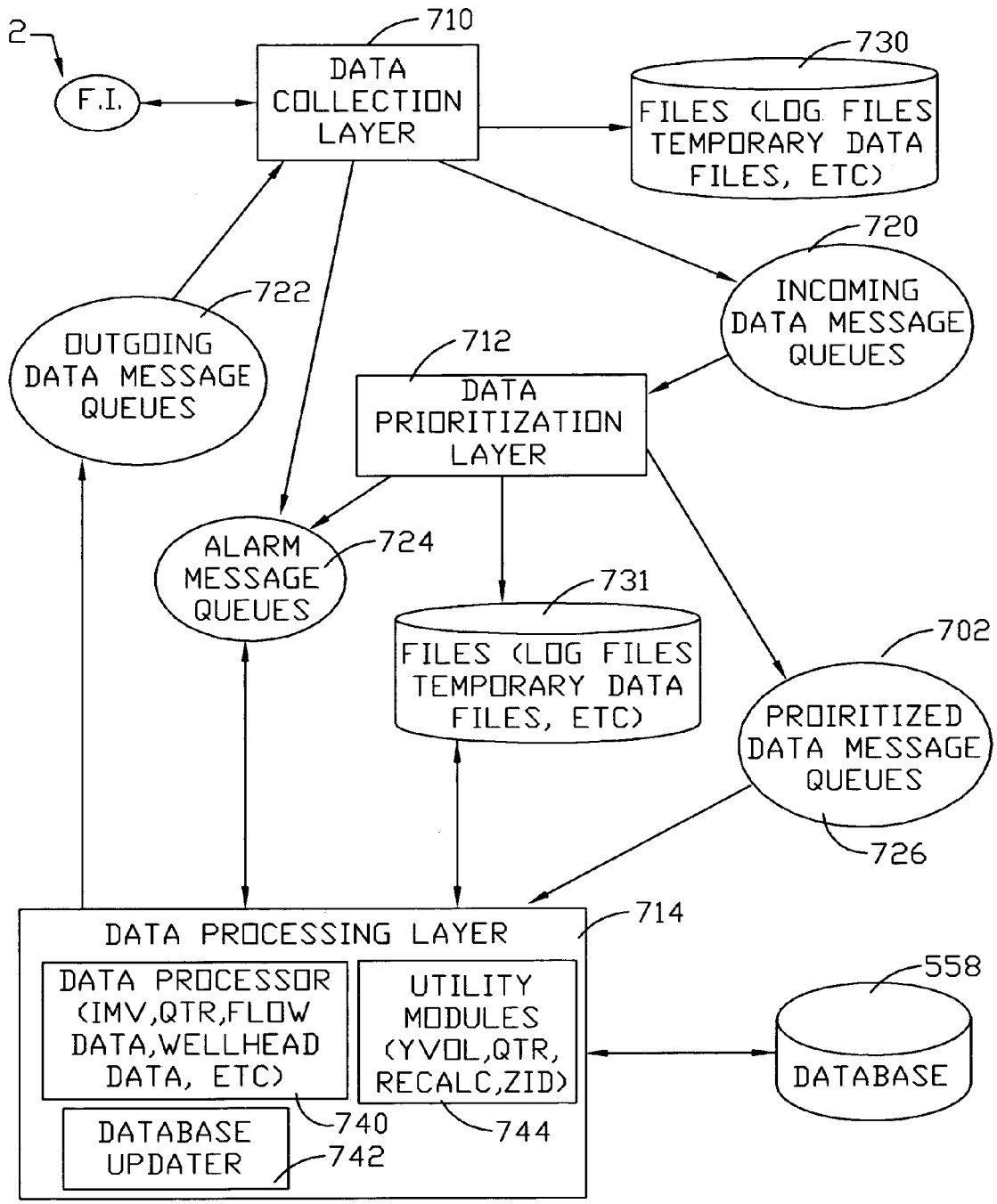
FIG. 14 is a conceptual flow diagram illustrating the general overview of the architecture of the server/data base system and the flow of data in the system, according to one preferred embodiment of the present invention.

FIG. 14 illustrates the general overview of the architecture of the server/data base system, shown generally by reference numerals 702 in FIG. 14, parts of which have been described above. In particular, FIG. 14 illustrates the flow of data amongst the different layers of the server/data base system 702, namely the Data Collection Layer 710, the Data Prioritization Layer 712, the Data Processing Layer 714 and the Database 558. Furthermore, the server/data base system 702 can be considered to have three separate tiers. The first tier comprising the Data Collection Layer 710 and the Data Prioritization Layer 712, involved in collecting and prioritizing the data. The second tier comprising the Data Processing Layer 714 which processes the collected data. The third tier can be considered the Database 558 itself. The components of the server/data base system 702 will now be discussed.

In addition to the Data Collection Layer 710, the Data Prioritization Layer 712, and the Data Processing Layer 714, the server/data base system 702 also comprises the field instrument FI 2 which collects the digital reading output data from the various remote locations, which remote locations may be geographically separated. The system 702 also comprises Incoming Message Queues 720 which is used to store valid binary data from the field instrument unit FI 2. The Incoming Data Message Queues 720 also include a Data Request Message Queues (not shown) for requesting updated data for authentication.

The system 702 also comprise Outgoing Message Queues 722 which are queues used to store binary data that need to be sent back to the field instrument unit FI 2 on the next connection thereto. This data could include items such as Yesterday's Volume, etc., which may be required by the field instrument unit FI 2 in order to perform further measurements and/or provide processed digital output readings, as opposed to digital output readings which may merely comprise raw data. The Outgoing Message Queues 722 also contain data for the Data Collection Layer 710 and also include the registration confirmation number.

The system 702 also comprises other queues as follows:

The Alarm Message Queues 724 contain all alarm data generated by all of the layers 710, 712 and 714. This alarm data may include invalid connection notifications, bad connection channel notifications, invalid data notifications, missing data point notifications and no trend notifications. The Prioritized Data Message Queues 726 contains stored binary data, similar to the data which may be stored in the Incoming Message Queues 720 except that they are re-ordered with more important data stored at the front of the queues. For example, the Prioritized Data Message Queues 726 may have cry-out alarm data from the field instrument unit FI 2 put in front of the data and the queue so that it can be processed as early as possible. The prioritized data from the Prioritized Data Message Queues 726 are then sent to the Data Processing Layer 714 for processing.

The files, shown generally by reference numeral 730, 731, in the system 702 include various log files from the different layers 710, 712 and 714, as well as temporary data files, and other files which may be used by the system 702 as discussed below. The files 730, 731 are used to provide more information about the system 702 when problems occur, and, to provide temporary storage for data before the data is saved to the Database 558.

In a preferred embodiment, the Database 558 is used to store all relevant data generated by all of the layers 710, 712, and 714. The data includes Alarm data, Sensor data, Wellhead data, Flow data and Quantity Transaction Records (QTR's). The data base manager program is preferably provided by Oracle (trade name).

The operation of the various layers will now be discussed. The Data Collection Layer 710 is principally responsible for accepting connections from the field instrument unit FI 2. Once the connection is accepted, the binary data from the tool connected to the corresponding field instrument unit FI 2 will be authenticated to ensure integrity of the data. If the data is valid, the Data Collection Layer 710 stores the data in the Incoming Data Message Queues 720. At the same time, the Data Collection Layer 710 will check the Outgoing Data Message Queues 722 and see if there is any data needed to be sent back for this connection to the field instrument unit FI 2, and if so, the data will be retrieved from the Outgoing Data Message Queues 722 and sent to the tool associated with that particular field instrument unit FI 2. The Data Collection Layer 710 may also use the data from the Outgoing Data Message Queues 722 to authenticate the connection.

If the Data Collection Layer 710 detects any error while receiving data from the tool connected to the corresponding field instrument unit FI 2, the Data Collection Layer 710 will report the error into Log Files 730. The type of error which may be detected includes invalid connection and bad channel detection. In some cases, this Data Collection Layer 710 will generate an alarm, through any possible means including email notification, and will also send the alarm data into the Alarm Message Queues 724 so that the alarm information can be saved in the Database 558.

With respect to the Data Prioritization Layer 712, the main purpose of this Layer 712 is to make sure that important data will be processed by the system 702 as soon as possible. The Data Prioritization Layer 712 receives binary data from the Incoming Data Message Queues 720 and determines what types of data it is. Once the type of data is determined, a priority is assigned and a binary message is passed onto the Prioritized Data Message Queues 726. Any binary data with higher priority will be put to the head of the Prioritized Data Message Queues 726 so that it will be processed first by the Data Processing Layer 714. If an error occurs in a Data Prioritization Layer 712, it will report the error to Log File 731.

The Data Processing Layer 714 is the main processing centre for data of the system 702. The Data Processing Layer 714 consists of the Data Processor Module 740, the Database Updater Module 742 and various Utility Modules 744. The Data Processor Module 740 and Database Updater Module 742 may optionally be combined into one single executable.

The Data Processor Module 740 receives binary data from the Prioritized Data Message Queues, parses the data according to the Application Layer Protocol 560 discussed above and generates an IMV value, QTR's and Flow data based on the parsed data. That data, as well as the parsed data, will be saved to buffers in memory. The same data will also be saved to temporary data files in case the system 702 crashes. The IMV values will be sent to the Outgoing Data Message Queues 722 so that the Data Collection Layer 710 can send the values back to the tool of the corresponding field instrument unit FI 2 on the next connection to the field instrument unit FI 2. If required, the Data Processor Module 740 may retrieve data directly from the Database 558 in order to process the data properly. If the Data Processor Module 740 encounters an error while processing data, the error will be reported to the Log Files 731. The type of error this module will detect includes invalid data with a valid type, missing data points, no data package (namely no trend records) and other types of errors. In some cases, an alarm will be generated and the alarm data will be saved to the alarm buffers in the Program and Temporary and Data File 731. The data processed by the Data Processor Module 740 may include Trend Data, Wellhead Data, IMV values, Flow data and QTR's. The Data Processing Module 740 may process the data according to known algorithms such as AGA-3-92 (Orifice Metering of Natural Gas and other related hydrocarbons), AGA-8-94 (Compressibility Factors of Natural Gas and Other Related Hydrocarbon Gases) and Base software modules such as the "Gas Orifice Flow Program C Language Computer code Using A.G.A. Report No. 3 (1992) and No. 8 (1994), GOFLIBC Source-A Version 1.3" as well as any other algorithms presently known or which may be developed in the future.

The Database Updater Module 742 is principally responsible for saving processed data into the Database 558. The Database Updater Module 742 will receive data from Alarm Message Queues 724 and stored in the Database 558. The Alarm Message Queues 724 may not necessarily have data to be saved to the Database 558 all the time. So the Database Updater Module 742 will regularly wake up and check for data from the Alarm Message Queues 724 and then save the data to the buffer in memory if any data exists. The Database Updater Module 742 also check the buffers to see if there is data to be saved, but generally will wait until sufficient data is accumulated in the buffers before it is saved to the Database 558. In this way, the Database 558 is not overwhelmed with constant access from the Database Updater Module 742, and, the Module 742 can make reasonably certain that the data will be saved in the Database 558 in a timely fashion. If the Database Updater Module 742 encounters errors while processing the data, the errors will be reported to the Log File 731.

The Utility Module 744 is used in cases where data needs to be calculated once per day, or, in a pre-defined schedule. One example could be the calculation of Yesterday's Volume YVOL. In order to perform these tasks in an efficient way, the Utility Modules 744 deal with one or more of these tasks. For example, the Yesterday's Volume Utility Module YVOL 744 is responsible for waking up at a pre-defined time during the day, and, retrieving data from the Database 558 and calculating the volume for each tool associated with each field instrument unit FI 2. The calculated data is then saved to the Outgoing Data Message Queues 722. If the module YVOL 744 encounters an error while processing the data, the error will be reported to the Log File 731.

The Quantity Transaction Records recalculation Utility Module QTR Recalc 744, from time to time, recalculates the data, such as the flow parameter changes, to ensure that the data is correct. The ZID Utility Modules ZID 744 calculate the data updates which may be required by the Data Collection Layer 710 to authenticate any data coming from time to time, the ZID data may be updated in the Database 558 but may not be updated in the Data Collection Layer 710. The Data Collection Layer 710 will detect and outdated ZID data and send a request to a ZID Request Message Queue (not shown) for the new and updated ZID data. The ZID Data Update Module will regularly check this queue for any request from the Data Collection Layer 710. If a request is found, the ZID Utility Module ZID 744 will retrieve the data from the Database 558 and send it to the Outgoing Data Message Queues 722 so that the Data Collection Layer 710 can forward it to the appropriate field instrument unit FI 2. If the ZID Utility Module encounters any errors while processing the data, the errors will be reported in the Log File 731.

The Utility Module 744 may have additional modules to perform additional tasks. For instance, the Module 744 may have a registration confirmation number which confirms registration numbers to the Data Collection Layer 710 to ensure that the correct encrypted information is being provided by a field instrument unit FI 2. This can occur, for instance, when a field instrument unit FI 2 automatically and autonomously connects to the central location 500, as described above. This could also occur after a field instrument unit reconnects to the system from a temporary prolonged interruption. More preferably this confirmation may occur at the beginning of each connection to a field instrument unit FI 2. The Utility Module 744 can provide a confirmation number to the Data Collection Layer 710 to confirm the encrypted identification number being received from the field instrument unit FI 2 in order to improve the security of communications from the field instrument unit FI 2 to the Database 558. Additional security features include the layers 710, 712, 714 authenticating the information being received, and, having the Database 558 located behind a firewall. Furthermore, when a new field instrument unit FI 2 is to be added to the system 702, the encrypted identification number unique to the new field instrument unit FI 2 can be previously stored in the system 702. This way, if the field instrument unit FI 2 automatically and autonomously connects to the system 702, the system 702 will have the information required to authenticate the new field instrument unit FI 2.

As noted earlier, in one of the preferred embodiments, the collected data is communicated through the wireless modem to a remote point. This communication may be initiated either by the instrument via the installed operating system or initiated by a remote user-database server. The data may be routed through a public telephone network, or the Internet or a private communications network to one or more users or databases utilizing TCP/IP. In yet another mode, data is exchanged during an interactive session to provide "real time" readout to either the local terminal or a remote user.

In the alarm mode, process and system status information is sent automatically through one or more of the instrument's communication channels. Data delivery is initiated when a process value calculation or system error determines that an alarm condition exists. Typical examples would be low flow, over pressure, total volume, limits etc.

APPLICATIONS

An application of the novel instrument and system herein disclosed includes flow metering. The instrument samples data at a rate of up to once per second to enable high temporal resolution flow calculations to be performed. The system would be suitable for custody transfer accounting, point-of-use metering, and transmission pipeline leak checking. The instrument normally acts in a remote data dump mode to deliver logged flow data and flow statistics to a user's database via a wireless digital modem. If required, the instrument can switch into alarm mode to signal that a process variable or state is out of specification or it can be periodically interrogated to read process conditions. The location of the instrument would include the wellhead or pipeline monitoring station. Communication means include wireless communication provided either by terrestrial cellular service (digital packet or circuit switched) or digital satellite link. The primary requirements would be for remote, unattended and accurate collection and time stamping of flow rate and total volume data.

Another application would be flow metering using orifice meters. The instrument would require an internal analog P sensor, an internal or external dP sensor (as required by the accuracy needs of the location) and an external RTD temperature sensor. Flow rate or total volume through an orifice meter determined using orifice characteristics and AGA flow equations.

Yet another application would be with a turbine or displacement flow meters. The instrument requires an internal analog P, an external RTD temperature sensor and one or more digital input capture channels to count pulses from the flow meter. Accurate flow rate determination is achieved by using pressure and temperature compensation in conjunction with the digital input count rate.

Still yet another application includes an ultrasonic and multi phase flow meters. The instrument requires an internal analog P, an external RTD temperature sensor and a digital communication port (RS-485) to interface the ultrasonic flow meter. Accurate flow rate determination is achieved by using the pressure and temperature values to determine the Reynolds number of the flow profile past the flow meter, which in turn allows accurate correction of the flow meter readings.

With the teachings of the present invention, the instrument and method can be used for production monitoring and optimization. The instrument samples data about once per minute to monitor production pressure. Instrument acts in a remote data dump mode to deliver logged pressure data and statistics to a user's database. If required, the instrument can automatically switch into alarm mode to signal that a pressure is out of specification or it can be periodically interrogated to read the current pressure. The instrument would be located on or near the wellhead. Communication means includes wireless communication provided either by terrestrial cellular service (digital packet or circuit switched) or digital satellite link. Primary requirements include remote, unattended determination of wellhead pressure. Wellheads would be equipped with an instrument using both a P and RTD sensors. Pressure measurement rate is on the order of minutes to hours, typically time stamped, logged and dumped after many days. Instrument generates an alarm immediately if pressure deviates outside an established performance band.

Although the preferred embodiment describes the system as including pressure sensors 4,6, the invention is not so limited. It is to be appreciated that the system may also be used in the monitoring and measuring of other characteristics and/or readings of different types of facilities, oil and/or gas or other facilities, and other sensors may therefore be used either with or without the enclosure. These characteristics can include pressure, differential pressure, volume, energy, mass, distance, viscosity, specific gravity, frequency, electrical current and voltage, and molar heating volume.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a review thereof.

We claim:

1. A system for sensing a characteristic at least one remote location and transferring data indicative of the sensed characteristic to a data base located at a central location, remote from the remote location, said system comprising:

at the remote location:

a sensor for producing a digital output reading indicative of the sensed characteristic;

memory for storing the digital output reading;

a first communication unit for sending and receiving information to and from the remote location and the central location;

a processor for controlling the first communication unit to send and receive information, controlling the sensor to produce the digital output reading and storing the digital output reading in the memory;

at the central location:

a second communication unit for sending and receiving information to and from the first communication unit at the remote location;

a data base for storing data received from the remote location;

wherein the processor causes the digital output readings to be stored in the memory until the digital output reading can be transmitted to and received by the second communication unit; and wherein the processor determines whether or not data can be transmitted to and received by the second communication unit at the central location, and, controls the first communication unit to send data corresponding to the digital output reading when the second communication unit can receive the data;

a plurality of field instrument units, each said field instrument unit housing the sensor, the memory, the first communication unit and the processor, and wherein each field instrument unit is located at a separate remote location geographically separated from each other for sensing characteristics at each of the remote locations and transferring data indicative of the sensed characteristics of the corresponding remote location to the data base located at the central location;

and wherein the plurality of field instrument units are arranged in a star topology with the data base of the central location located at the center of the star topology.

2. The system as defined in claim 1 wherein the field instrument units and processors located at the central location interchangeable act as servers and clients in the star topology.

* * * * *